US012783492B2

(12) United States Patent
Zhang et al.

(10) Patent No.: US 12,783,492 B2
(45) Date of Patent: Nov. 3, 2026

(54) DATA COLLECTION METHOD AND APPARATUS, COMPUTER DEVICE, AND STORAGE MEDIUM

(71) Applicants: Douyin Vision Co., Ltd., Beijing (CN); Lemon Inc., Grand Cayman (KY); Huazhong University of Science and Technology, Wuhan City (CN)

(72) Inventors: Jianshun Zhang, Beijing (CN); Fang Wang, Wuhan City (CN); Sheng Qiu, Los Angeles, CA (US); Yi Wang, Beijing (CN); Jiaxin Ou, Beijing (CN); Baoquan Li, Wuhan City (CN); Junxun Huang, Beijing (CN); Dan Feng, Wuhan City (CN)

(73) Assignees: Douyin Vision Co., Ltd., Beijing (CN); Lemon Inc., Grand Cayman (KY); Huazhong University of Science and Technology, Wuhan City (CN)

( * ) Notice: Subject to any disclaimer, the term of this patent is extended or adjusted under 35 U.S.C. 154(b) by 90 days.

(21) Appl. No.: 18/790,545

(22) Filed: Jul. 31, 2024

(65) Prior Publication Data

US 2025/0190417 A1 Jun. 12, 2025

(51) Int. Cl.

*G06F 16/22* (2019.01)
*G06F 3/06* (2006.01)
*G06F 12/02* (2006.01)
*G06F 16/18* (2019.01)
*G06F 16/215* (2019.01)

(52) U.S. Cl.

CPC ...... *G06F 16/2282* (2019.01); *G06F 16/2246* (2019.01)

(58) Field of Classification Search

CPC ............ G06F 16/2282; G06F 16/2246; G06F 3/0652; G06F 3/0608; G06F 12/0253; G06F 16/1815; G06F 16/215; G06F 16/2228

See application file for complete search history.

(56) References Cited

U.S. PATENT DOCUMENTS

| | | | | |
|---|---|---|---|---|
| 2019/0065621 | A1* | 2/2019 | Boles | G06F 16/9027 |
| 2020/0225882 | A1* | 7/2020 | Li | G06F 12/0246 |
| 2021/0157746 | A1* | 5/2021 | Lee | G06F 12/0246 |
| 2022/0335028 | A1* | 10/2022 | Xue | G06F 16/2246 |
| 2024/0028596 | A1* | 1/2024 | Lakshman | G06F 12/0253 |
| 2024/0370363 | A1* | 11/2024 | Lee | G06F 12/0246 |

* cited by examiner

*Primary Examiner* — Charles Rones
*Assistant Examiner* — Mohammad S Bhuyan

(57) ABSTRACT

The present disclosure provides a data collection method and apparatus, a computer device, and a storage medium. The method includes: determining, in response to a garbage collection request, respective first index entries from a first data table to be processed, first key data and storage location information in the first data table of a first key-value pair data corresponding to the first key data are stored in the first index entries; selecting valid target key data from the first key data according to current respective second data tables in the log-structured merge tree; reading target value data corresponding to the respective target key data in the first data table according to storage location information in the first index entries; constructing a new first data table according to the target key data and the target value data, and collecting the first data table to be processed.

20 Claims, 6 Drawing Sheets

DATA COLLECTION METHOD AND APPARATUS, COMPUTER DEVICE, AND STORAGE MEDIUM

CROSS-REFERENCE TO RELATED APPLICATION

This application claims the priority to and benefits of the Chinese Patent Application, No. 202311662286.5, which was filed on Dec. 6, 2023. The aforementioned patent application is hereby incorporated by reference in its entirety.

TECHNICAL FIELD

The present disclosure relates to the field of computer technology, and in particular to a data collection method and apparatus, a computer device, and a storage medium.

BACKGROUND

As a basic component of a modern storage system, a key-value storage system based on a Log-Structured Merge Tree (hereinafter referred to as LSM-tree) may provide an underlying storage service for various data-intensive applications such as a distributed database, a distributed file system, and streaming data processing, etc. However, the conventional LSM-tree based key-value storage system requires frequent and repeated reads and writes during a data compaction operation, resulting in a severe issue of data read/write amplification and resource waste.

In order to solve the issue of read/write amplification, a key-value separated LSM-tree key-value storage system appears. Although this type of key-value storage system can solve the issue of read/write amplification caused by the compaction operation to a certain extent, it needs to introduce a Garbage Collection (GC) operation. Although the GC operation can play a role in collecting storage space where value data is located, the current GC operation needs to read all the stored value data without distinguishing invalid data, which greatly reduces the efficiency of the GC operation.

SUMMARY

The embodiment of the present disclosure at least provides a data collection method and apparatus, a computer device and a storage medium.

In a first aspect, an embodiment of the present disclosure provides a data collection method, including:

- determining, in response to a garbage collection request, respective first index entries from a first data table to be processed, wherein first key-value pair data and the first index entries are stored in the first data table, the first key-value pair data is derived from a key-value separated log-structured merge tree, and first key data and storage location information in the first data table of the first key-value pair data corresponding to the first key data are stored in the first index entries;
- selecting valid target key data from the first key data stored in the respective first index entries according to current respective second data tables in the log-structured merge tree;
- reading target value data corresponding to the respective target key data in the first data table according to storage location information in the first index entries where the respective target key data are located; and
- constructing a new first data table according to the target key data and the target value data, and collecting the first data table to be processed, wherein target key-value pair data consisting of the target key data and the target value data, as well as new first index entries, are stored in the new first data table, the target key data and storage location information in the new first data table of the target key-value pair data corresponding to the target key data are comprised in the new first index entries.

In a second aspect, the embodiment of the present disclosure also provides a data collection apparatus, including:

- a determination module, configured to determine, in response to a garbage collection request, respective first index entries from a first data table to be processed, wherein first key-value pair data and the first index entries are stored in the first data table, the first key-value pair data is derived from a key-value separated log-structured merge tree, and storage location information in the first data table of first key data and the first key-value pair data corresponding to the first key data are stored in the first index entries;
- a first selecting module, configured to filter out valid target key data from the first key data stored in the respective first index entries according to current respective second data tables in the log-structured merge tree;
- a reading module, configured to read target value data corresponding to the respective target key data in the first data table according to the storage location information in the first index entries where the respective target key data are located; and
- a collection module, configured to construct a new first data table according to the target key data and the target value data, and collect the first data table to be processed, wherein target key-value pair data consisting of the target key data and the target value data, as well as new first index entries, are stored in the new first data table; the target key data and storage location information in the new first data table of the target key-value pair data corresponding to the target key data are comprised in the new first index entries.

In a third aspect, an alternative implementation of the present disclosure further provides a computer device including a processor and a memory, wherein the memory stores machine-readable instructions executable by the processor, the processor is configured to execute the machine-readable instructions stored in the memory, and when the machine-readable instructions are executed by the processor, the processor performs the steps in the first aspect described above, or in any possible implementation of the first aspect.

In a fourth aspect, an alternative implementation of the present disclosure also provides a computer-readable storage medium, on which a computer program is stored, which, when executed, performs the steps in the above-mentioned first aspect or any possible implementation of the first aspect.

In a fifth aspect, an alternative implementation of the present disclosure also provides a computer program product, including a computer program, which, when executed, performs the steps in the above-mentioned first aspect or any possible implementation of the first aspect.

For the description of the effects of the above data collection apparatus, computer device and computer-readable storage medium, please refer to the description of the above data collection method, which is not repeated here.

According to the data collection method and apparatus, the computer device, and the storage medium provided in the embodiments of the present disclosure, since the first index entries including the first key data in the first key-value pair data and storage locations are stored in the first data table, the respective first key data may be obtained quickly according to the first index entries when a garbage collection operation is needed, and the respective valid target key data may be determined quickly and accurately from the first key data according to the second key data stored in the second data table, and thus the invalid first key data is filtered out. The first value data corresponding to the target key data is read according to the storage locations indicated in the first index entries, so that the valid key-value pair data can be read without reading the value data corresponding to the invalid first key data, thereby reducing the data reading amount and improving the data reading speed. Finally, a new first data table is constructed according to the target key data and the read corresponding first value data, so that the first data table including valid key data can be constructed quickly. The collection of the first data table to be processed may realize quick collection of invalid key-value pair data and realize real-time collection of storage space occupied by the invalid key-value pair data in the first data table to be processed. Since the reading of the value data corresponding to the invalid first key data is not needed in the entire process of garbage collection, the data reading amount may be effectively reduced, thereby accelerating garbage collection and improving the efficiency of garbage collection.

According to the data collection method and apparatus, the computer device, and the storage medium provided in the embodiments of the present disclosure, with respect to the respective second data tables with a log-structured merge tree structure, by setting the first target index data blocks in the second data tables, the index entries corresponding to the key-value pair data with a data volume greater than a preset data volume and the key-value pair data with a data volume less than the preset data volume may be identified separately, which can thereby make it possible to directly skip the key-value pair data with a data volume less than the preset data volume in the process of performing a validity check (i.e., determining whether the first key data is the target key data) for the first key data using the second data tables, thereby reducing the validity check overhead under a variable-length load (i.e., the length of the key-value pair data is not fixed), and improving the efficiency of garbage collection.

According to the data collection method and apparatus, the computer device, and the storage medium provided in the embodiments of the present disclosure, hot and cold splitting of key-value pair data may be realized by setting different data features (i.e., the cold data feature and hot data feature) for the first data table. Further, during the garbage collection operation, the first data table(s) with the hot data feature may be processed preferentially, thus reducing the reading and writing of the first data table(s) with the cold data feature.

According to the data collection method and apparatus, the computer device, and storage medium provided in the embodiments of the present disclosure, after the actual use of the storage space is detected (i.e., after the target storage space is determined), a custom-configured preset space threshold is utilized to perform a slowdown or a pause of user's data write operation and to actively adjust the number of garbage collection threads, ensuring that the use of the storage space is controllable, and providing a better balance between the storage space and the data write performance.

To make the objectives, features and advantages of the present disclosure more comprehensible, the following is a detailed description of preferred embodiments in conjunction with the accompanying drawings.

BRIEF DESCRIPTION OF DRAWINGS

To describe the technical solutions in the embodiments of the present disclosure or in the prior art more clearly, the accompanying drawings required in the description of the embodiments or the prior art will be described briefly below. The accompanying drawings, which are incorporated in and constitute a part of this specification, illustrate embodiments consistent with the disclosure and together with the description, serve to explain the technical solution of the disclosure. It should be understood that the following accompanying drawings illustrate only certain embodiments of the present disclosure and therefore should not be considered as limiting the scope. Other accompanying drawings can also be derived from these drawings by those ordinarily skilled in the art without creative efforts.

DETAILED DESCRIPTION

In order to make the purpose, technical scheme and advantages of the embodiment of the disclosure clearer, the technical scheme in the embodiment of the disclosure will be described clearly and completely with the attached drawings. Obviously, the described embodiment is only a part of the embodiment of the disclosure, but not the whole embodiment. Components of embodiments of the present disclosure generally described and illustrated herein may be arranged and designed in various different configurations. Therefore, the following detailed description of the embodiments of the present disclosure is not intended to limit the scope of the claimed disclosure, but merely represents selected embodiments of the disclosure. Based on the embodiments of the present disclosure, all other embodiments obtained by those skilled in the art without creative work belong to the scope of protection of the present disclosure.

In addition, the terms "first" and "second" in the description and claims in the embodiment of this disclosure and the above drawings are used to distinguish similar objects, and are not necessarily used to describe a specific order or sequence. It should be understood that the data so used can be interchanged under appropriate circumstances, so that the embodiments described herein can be implemented in other orders than those illustrated or described herein.

The term "multiple or several" as mentioned herein refers to two or more. The term "and/or", which describes the relationship of related objects, means that there can be three kinds of relationships, for example, A and/or B, which can mean that A exists alone, A and B exist together, and B exists alone. The character "/" generally indicates that the context object is in "or" relationship.

It should be noted that similar symbols and letters indicate similar items in the following drawings, so once an item is defined in one drawing, it does not need to be further defined and explained in subsequent drawings.

Figure 1:
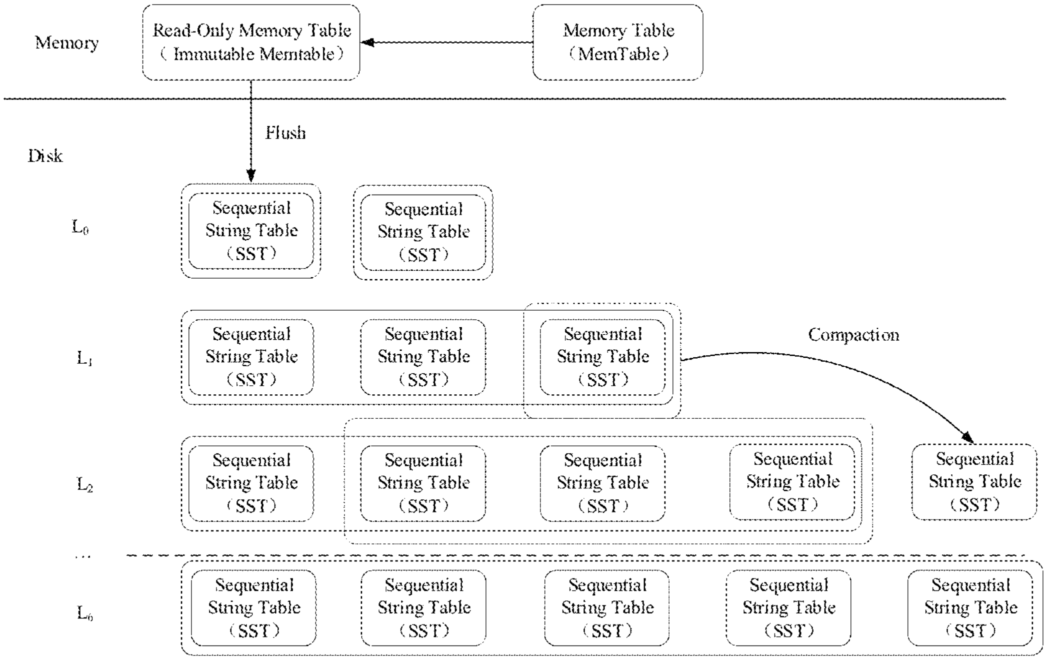
FIG. 1 shows an exemplary structure of an LSM-tree key-value storage system according to an embodiment of the present disclosure.

It has been found that an LSM-tree based key-value storage system usually adopts a hierarchical structure, which mainly consists of two parts: a memory and a persistent storage medium (Disk). The hierarchy of the memory mainly contains a memory table (hereinafter referred to as MemTable) and a read-only immutable memory table (hereinafter referred to as Immutable Memtable), which are used for buffering a data write operation from a user and subjected to the initialization sorting. The hierarchy of the persistent storage medium contains a tree structure with multi-level organization, each level contains multiple sorted string tables (hereafter referred to as SSTables or SSTs). When a Memtable reaches a certain threshold, its status will become read-only, i.e. it becomes an Immutable Memtable. Then a new Memtable will be created to accept a subsequent write operation from the user. The Immutable Memtable will be read by a background thread and converted to the top level of the SSTable on the persistent storage medium, i.e. Level0 ($L_0$ for short), and this process is also called flush. In the LSM-tree based key-value storage system, SSTable files are organized into multiple levels by a compaction operation, the SSTable files at an upper level and a next level are subjected to merge sort together, data is gradually merged and written into the next level, invalid and obsolete data is deleted, the overall order of the data is improved, and accordingly the read performance is guaranteed. FIG. 1 shows an exemplary structure of an LSM-tree key-value storage system according to an embodiment of the present disclosure.

Figure 2:
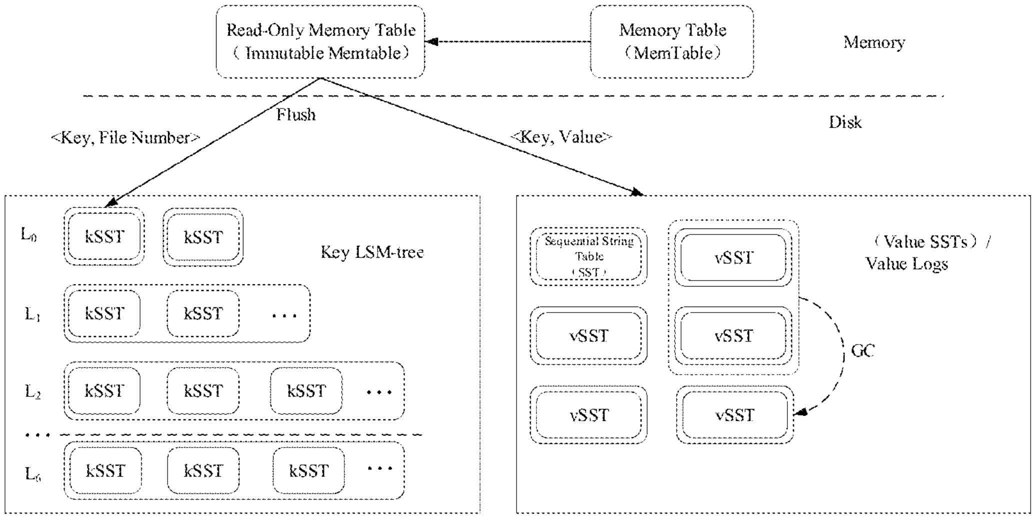
FIG. 2 shows a structural design of a key-value separated LSM-tree key-value storage system according to an embodiment of the present disclosure.

However, the original compaction operation within the LSM-tree based key-value storage system needs to read and write data frequently, which results in severe issue of read/write amplification. Therefore, it is proposed to store keys and values in key-value pair data separately, i.e., the keys and index information are stored in an original LSM-tree, while the key values are stored in a separate log-structured (value sorted string tables (Value SSTs)/Value Logs), thereby avoiding the repeated readings and writings of a value in the original compaction operation, and effectively reducing read/write amplification. FIG. 2 shows a structural design of a key-value separated LSM-tree key-value storage system according to an embodiment of the present disclosure. In the structural design, a portion of values is stored in a sorted table file of an independent SSTable (i.e., Value SST, vSST for short), and keys as well as a file number of Value SSTs where the values are located are stored in an SSTable (i.e., Key SST, or kSST for short) of the original LSM-tree, thus key-value separated storage is realized. Moreover, key-value pairs smaller than a specified separation threshold (i.e., small key-value pair data) are also stored in the LSM-tree. Other structures of the key-value separated LSM-tree key-value storage system, such as the Memtable, and the Immutable Memtable are kept consistent with the original LSM-tree. During the operation of the system, whether a garbage rate of the Value SSTable reaches a predefined trigger threshold will be determined. If the garbage rate exceeds the threshold, a background garbage collection thread will be scheduled to perform garbage collection (GC for short) on Value SSTs, to collect space occupied by the expired key-value data contained in Value SST files.

The key-value separated LSM-tree may alleviate the issue of read/write amplification caused by the compaction operation to a certain extent, and reduce the performance impact of the original LSM-tree read/write amplification by reducing the amount of data stored in the LSM-tree. However, a storage region used by the value data still needs garbage collection in the meantime, which introduces a new I/O-intensive GC operation. The GC operation becomes a new performance bottleneck for the key-value separated LSM-tree after the compaction. Moreover, although the key-value separated LSM-tree key-value storage system introduces the GC operation to collect the storage space, the issue of space amplification is still serious, i.e., the actual storage space used is much larger than the original dataset size. The essence of the key-value separated LSM-tree is to sacrifice the storage space to obtain performance gain of user request processing, but it doesn't mean that storage space can be sacrificed all the time, especially in a production environment where the storage cost is extremely sensitive. The existing key-value separated LSM-tree tends to ignore the issue of space amplification, and does not make reasonable and effective limitations on the actual storage space used, which may lead to a problem of unavailable services in extreme scenarios due to the storage device being full.

In addition, the key-value separated LSM-tree key-value storage system is designed mainly against the load of large data volume of key-value pairs at the beginning, but it ignores the most common variable-length load as well as hot and cold loads in the production environment, so that its GC operation does not make full use of load features of the production environment, resulting in the lower GC efficiency and the introduced read/write amplification remaining severe. Under the variable-length load, the GC execution time increases significantly. Under the hot and cold loads, cold data that does not need to perform GC is read and written during GC, i.e., the existing key-value separated LSM-tree is not well adapted to the variable-length load and the hot and cold loads, and is unable to balance the performance of foreground data write performance and the use of storage space under the diversified load features, which affects the efficiency of the GC operation.

Based on the above research, according to the data collection method and apparatus, the computer device, and the storage medium provided in the embodiments of the present disclosure, since the first index entries including the first key data in the first key-value pair data and storage locations are stored in the first data table, the respective first key data may be obtained quickly according to the first index entries when a garbage collection operation is needed, and the respective valid target key data may be determined quickly and accurately from the first key data according to the second key data stored in the second data table, and thus the invalid first key data is filtered out. The first value data corresponding to the target key data is read according to the storage locations indicated in the first index entries, so that the valid key-value pair data can be read without reading the value data corresponding to the invalid first key data, thereby reducing the data reading amount and improving the data reading speed. Finally, a new first data table is constructed according to the target key data and the read corresponding first value data, so that the first data table including valid key data can be constructed quickly. The collection of the first data table to be processed may realize quick collection of invalid key-value pair data and realize real-time collection of storage space occupied by the invalid key-value pair data in the first data table to be processed. Since the reading of the value data corresponding to the invalid first key data is not needed in the entire process of garbage collection, the data reading amount may be effectively reduced, thereby accelerating garbage collection and improving the efficiency of garbage collection.

In order to facilitate the understanding of the embodiments of the present disclosure, the following first describes a forming process of the data collection method according to an embodiment of the present disclosure. Specifically, by comparing the I/O bandwidth usage of storage devices with the original LSM-tree key-value storage system (i.e., key-value storage system without key-value separation) and the key-value separated LSM-tree key-value storage system, it can be found that the compaction operation, which has the highest I/O overhead in the original LSM-tree key-value storage system, is no longer a performance bottleneck in the key-value separated LSM-tree key-value storage system, but the GC operation introduced by the key-value separated LSM-tree key-value storage system becomes the performance bottleneck. Just because the GC operation uses less storage device bandwidth as compared to the compaction operation that a foreground operation is allowed to have more on-disk bandwidth, thus obtaining a better foreground performance. The influence of GC on the foreground performance may be observed by allocating different numbers of threads to the GC operation. The more threads are allocated, the more frequently GC is executed, the more on-disk bandwidth is occupied, the greater the influence on the foreground performance, the more space it can collect, and the higher the collection efficiency. The best foreground performance can be obtained without GC at all, but its space amplification is also the largest. Therefore, to balance the space amplification and the foreground performance, a more efficient GC strategy is needed.

In order to obtain the more efficient GC strategy, the specific performance bottlenecks of the GC operation under different types of loads are analyzed in detail. Specifically, by disassembling GC latencies under different types of loads (fixed-length load and variable-length load), it is decomposed into several key steps involved in GC: reading data to be subjected to GC (i.e., Read), checking validity of the data to be subjected to GC (i.e., GC-Lookup), and copying and writing back valid data (i.e., Write). By way of disassembling, it is found that the latency of GC-Lookup accounts for a higher percentage under the fixed-length small-value load and variable-length load, while for a fixed-length large-value load, the GC overhead mainly comes from Read. Moreover, by observing the size of the LSM-tree where indexes corresponding to the value data are located, it can be found that the average latency of GC-Lookup is positively correlated with the size of the LSM-tree. Therefore, it can be shown that under different types of loads, the source of GC overhead is different, and it is necessary to do targeted optimization for different loads in order to improve the adaptability under diverse loads.

Based on the above analysis, the efficient garbage collection method for the key-value separated LSM-tree key-value storage system proposed in the embodiments of the present disclosure accelerates GC by optimizing the three key steps of the GC operation to minimize the I/O overhead during GC as much as possible, and proposes a spatial-awareness flow control strategy to limit the sharp increase of space amplification. By accelerating the execution of GC and flow control for space amplification, the embodiments of the present disclosure achieve a better balance between the storage space and the foreground performance under diverse loads to ensure the GC efficiency.

The defects in the prior art are the result of the inventor's practice and careful study, and therefore, the process of discovering the above-mentioned problems and the solution proposed in the present disclosure below to address the above-mentioned problems should be the inventor's contribution to the present disclosure in the course of the present disclosure.

It can be understood that before using the technical solutions disclosed in each embodiment of the present disclosure, the user should be informed of the type of personal information involved in the present disclosure, the scope of application, the use scenarios, etc., in accordance with the relevant laws and regulations and obtain the user authorization in an appropriate manner.

The data collection method provided in the embodiments of the present disclosure is generally executed by a terminal device or other processing device with certain computing capability. The terminal device may be UE (user equipment), a mobile device, a user terminal, a terminal, a PDA (personal digital assistant), a handheld device, a computing device, and the like. In some possible implementations, the data collection method may be implemented by a processor calling computer-readable instructions stored in a memory.

The data collection method provided in the embodiments of the present disclosure is described below taking an example in which the execution subject is a computer device.

Figure 3:
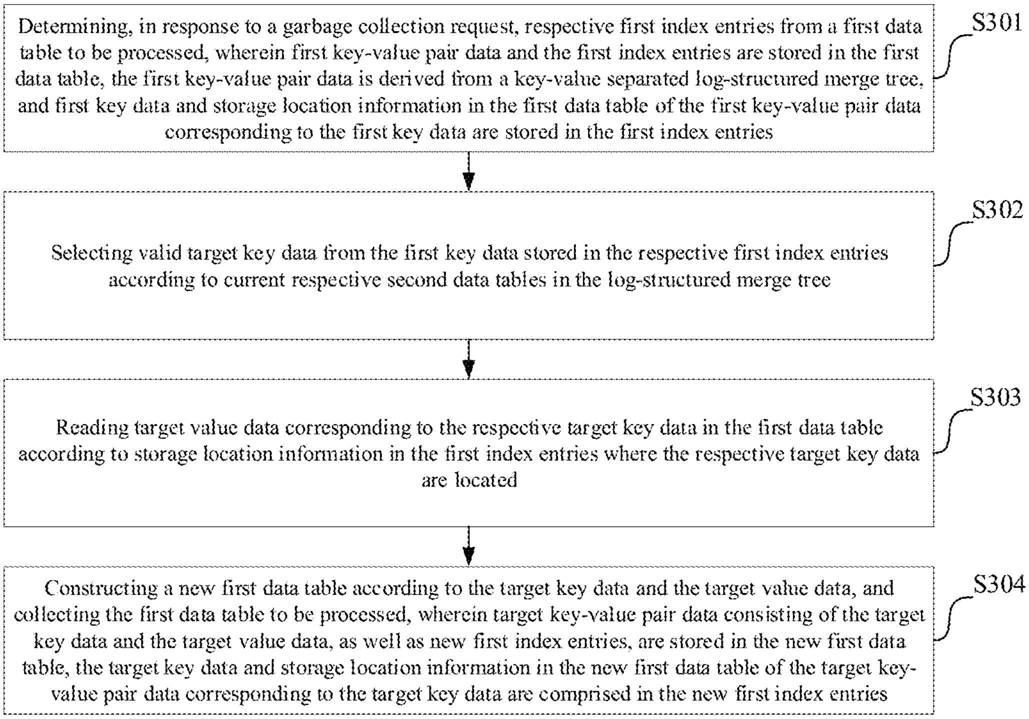
FIG. 3 shows a flowchart of a data collection method according to an embodiment of the present disclosure.

FIG. 3 shows a flowchart of a data collection method according to an embodiment of the present disclosure. The method may include the following steps.

S301, determining, in response to a garbage collection request, respective first index entries from a first data table to be processed, wherein first key-value pair data and the first index entries are stored in the first data table, the first key-value pair data is derived from a key-value separated log-structured merge tree, and first key data and storage location information in the first data table of the first key-value pair data corresponding to the first key data are stored in the first index entries.

In this embodiment, the garbage collection request may be a GC request initiated by a thread in the background for instructing the execution of a garbage collection operation on a storage space (containing one or more first data tables) where the value data in the key-value separated LSM-tree key-value storage system is located, so as to release the storage space.

One of the major sources of GC operation overhead in the key-value separated LSM-tree key-value storage system is a GC Read operation, i.e., reading the data to be subjected to GC, especially in a fixed-length large-value scenario, will leads to a high overhead ratio of the GC Read. However, from the overall perspective of GC, the GC read process does not need to read the value of invalid data, because it will be discarded directly after the data is determined to be invalid in a subsequent validity check, so the GC Read operation only needs to read the corresponding key data before performing the validity check, and then reduces I/O by reading the value data after determining that the corresponding data is valid based on the read key data. Therefore, in order to avoid reading the value data corresponding to invalid key data, the embodiments of the present disclosure propose a new data table format for storing value data, i.e., a record based table (RTable for short), for the key-value separated LSM-tree key-value storage system.

The first data table to be processed, i.e., one of the determined data tables to be subjected to garbage collection, is a data table for storing value data after key-value separation, and belongs to the Value SST, but the structure of the first data table has a new storage structure, and therefore, the first data table is a RTable. Multiple first key-value pair data, first index entries corresponding to the multiple first key-value data pair, respectively, and metadata information of the first data table are stored in the first data table. The multiple first index entries may form an index block, the metadata information may include filter (Filter) information, meta index (Meta index) information, and footer (Footer) information of a data table. The filter information is used for determining whether the data table contains a certain key-value pair data, the Meta index information and the Footer information are used for locating the index block consisting of the multiple first index entries in the first data table.

Figure 4:
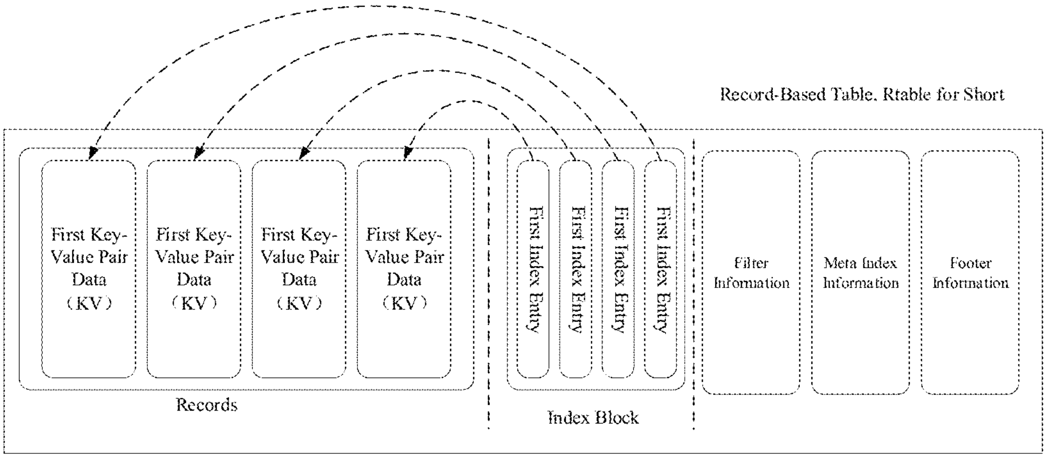
FIG. 4 shows a schematic structural diagram of a first data table according to an embodiment of the present disclosure.
Figure 5:
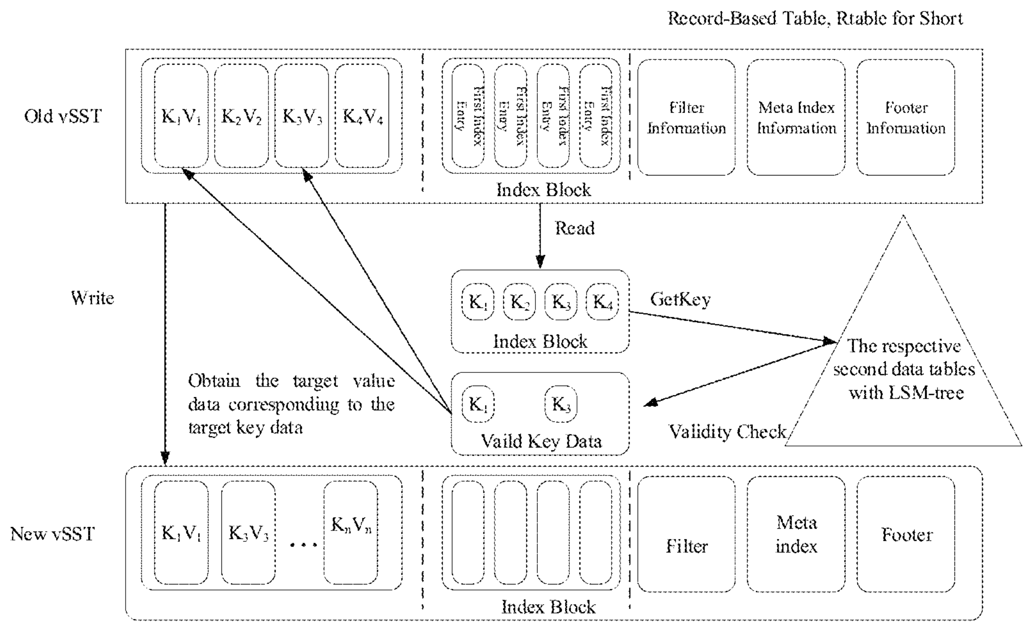
FIG. 5 shows a schematic diagram of a process of a data collection method according to an embodiment of the present disclosure.

The first key-value pair data includes first key data and first value data. The first index entry is used for storing the first key data and a storage location of the first key-value pair data corresponding to the first key data in the first data table. FIG. 4 shows a schematic structural diagram of a first data table according to an embodiment of the present disclosure. The part of Records refers to the respective first key-value pair data (i.e., KV shown in FIG. 4) stored. Index Block is an index data block, which includes first index entries corresponding to the stored respective first key-value pair data. Based on the respective first index entries, the first key-value pair data stored in corresponding location can be determined in the first data table. In FIG. 4, metadata information of the first data table, i.e., the Filter information, Meta index information, and Meta index information, are also shown.

In a specific implementation of Step 301, in response to the garbage collection request initiated by a background thread, the first data table to be processed may be determined, i.e., a RTable to be processed may be determined. Then, location of the index block in the first data table may be determined according to the metadata information of the first data table to be processed. According to the location, the index block is located in the first data table, and then, the respective first index entries may be obtained from the index block, thus determining the respective first index entries from the first data table.

S302, selecting valid target key data from the first key data stored in the respective first index entries according to current respective second data tables in the log-structured merge tree.

In this embodiment, the log-structured merge tree, i.e., the LSM-tree includes multiple second data tables with a tree structure. The second data tables are data tables for storing key data after key-value separation. The second data tables belong to Key SSTs, in which there may be stored respective second key data which may include key data identical to the first key data, or key data not identical to the first key data. In an implementation, the structure of the second data table may be the structure of a Key SST in the existing key-value separated LSM-tree key-value storage system, or it may be the structure of an index decoupled table (DTable for short) as described later.

Specifically, the key data in the large key-value pair data and indexes of the first data table in which the value data corresponding to the key data is located are stored in the second data table, or the small key-value pair data may also be stored therein. The large key-value pair data is the key-value pair data with a data volume greater than or equal to a preset data volume, and the small key-value pair data is the key-value pair data with a data volume less than the preset data volume. It should be noted that the first key-value pair data in the first data table are all large key-value pair data with a data volume greater than or equal to the preset data volume.

The target key data may be the first key data in the second data table that can be found to have the same second key data, which may be regarded as valid key data in the first key data. For example, if the first key data includes Key1, Key2, Key3, and the second key data includes Key1, Key3, Key4, then the target key data may be determined to be Key1 and Key3.

In a specific implementation, after the respective first key data is determined, a validity check may be performed on the respective first key data by utilizing the respective second data tables in the log-structured merge tree, i.e., a GC-Lookup operation may be performed on the respective first key data to determine whether the first key data is the latest key data. Specifically, with respect to any first key data, the second data table associated with the first key data may be searched level by level in a high or low order of the hierarchy to which the corresponding nodes of the respective second data tables belong in the log-structured merge tree. The second data table associated with the first key data includes second key data identical to the first key data, and in response to that there exists multiple second data tables containing the second key data identical to the first key data, a second data table at the highest hierarchical level is the second data table associated with the first key data.

Specifically, with respect to any of the first key data, the respective second data tables are traversed level by level to find whether a second data table containing second key data identical to that first key data exists. In response to that there exists multiple second data tables containing the second key data identical to the first key data, a second data table at the highest hierarchical level is a final matched second data table associated with the first key data. In response to that only one second data table containing second key data identical to that first key data exists, the unique second data table may be used as the final matched second data table associated with the first key data. Then, it may be determined whether the second key data stored in the second data table is of the same version as the first key data. In response to that the second key data is of the same version as the first key data, it is determined that the first key data is to be used as valid target key data. For example, it may be determined whether a file number corresponding to the second key data stored in the second data table is the same as a file number of the first data table in which the first key data is located. If the file numbers are consistent, the second key data and the first key data are of the same version, and the first key data may be used as valid target key data; if the file numbers are not consistent, it may be determined that the first key data is invalid key data.

Optionally, for any of the first key data, in response to that no second data table associated with the first key data is searched, the first key data is invalid key data.

Optionally, in response to that no second data tables associated with all the first key data in the first data table to be processed are searched, i.e., there is no target key data filtered from the first key data stored in the respective first index entries in the first data table, it can be shown that the first key data in the first data table to be processed are invalid key data, and thus the first data table to be processed can be recovered directly, i.e., the first data table to be processed can be deleted directly to collect the space occupied by the first data table to be processed, and there is no need to perform the following S303-S304.

S303, reading target value data corresponding to the respective target key data in the first data table according to storage location information in the first index entries where the respective target key data are located.

In a specific implementation, after the respective valid target key data is determined from the first key data, for each target key data, the first value data at the storage location may be read according to the storage location information stored in the first index entry in which the target key data is located, i.e., the target value data corresponding to the target key data is obtained, and the target value data is the valid value data.

S304, constructing a new first data table according to the target key data and the target value data, and collecting the first data table to be processed, wherein target key-value pair data consisting of the target key data and the target value data, as well as new first index entries, are stored in the new first data table, the target key data and storage location information in the new first data table of the target key-value pair data corresponding to the target key data are comprised in the new first index entries.

In this embodiment, the new first data table is a new data table constructed for the target key data and target value data valid in the first data table to be processed, and the new first data table may also be a RTable. The new first index entries corresponding to the target key data, the target key-value pair data corresponding to the target key data, and metadata information are stored in the new first data table. Storage locations of the target key data and target key-value pair data corresponding to the target key data in the first data table are stored in the new first index entries. Information associated with invalid key data other than the target key data in the first key data is not included in the new first data table.

In a specific implementation, a new first data table may be written in accordance with the storage structure of a RTable, and the respective target key-value pair data, a new index block (Index Block) consisting of the new first index entries, and metadata information determined according to the target key-value pair data and storage location information of the new index block in the new first data table are stored in the new first data table. Then, the first data table to be processed may be deleted, and in this way, garbage collection of invalid data in the first data table to be processed may be realized.

Figure 6:
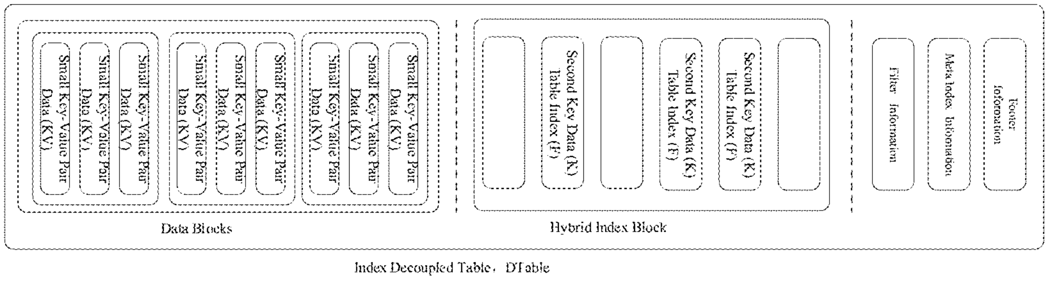
FIG. 6 shows a schematic structural diagram of a second data table according to an embodiment of the present disclosure.

FIG. 6 shows a schematic diagram of a process of a data collection method according to an embodiment of the present disclosure. An old value data sorted string table (i.e., Old vSST) is a first data table to be processed, which is a RTable containing first key-value pair data of $K_1V_1$, $K_2V_2$, $K_3V_3$, and $K_4V_4$, and further containing an index block). The index block stores first index entries corresponding to $K_1V_1$, $K_2V_2$, $K_3V_3$, and $K_4V_4$, for example, $K_1$ is stored in a first index entry corresponding to $K_1V_1$, and the storage location information of $V_1$ in the first data table is also stored. The read operation refers to determining the index block from the first data table to be processed, and then determining the first key data (i.e., $K_1$, $K_2$, $K_3$, and $K_4$) included in the respective first index entries from the index block. Then, a validity check operation may be performed. Second key data, also known as key data (GetKey) is read from the respective second data table with the log-structured merged tree structure (LSM-tree). Valid key data is determined according to the second key data (e.g., $K_1$ and $K_3$ are the valid key data, and $K_1$ and $K_3$ are used as the target key data). Then, target value data corresponding to the target key data (i.e., target value data $V_1$ and target value data $V_3$) may be obtained according to the storage location information in the first index entry. Finally, a new first data table (i.e., new value data stored string table (New vSST)) can be written according to the target key data and target value data.

In the data collection method provided in this embodiment, the first key-value pair data and the first index entries are stored in the first data table. The first key-value pair data is derived from the key-value separated log structure merge tree, the first key data and the storage location information of the first key-value pair data corresponding to the first key data in the first data table are stored in the first index entries. Accordingly, the respective first key data may be obtained quickly according to the first index entries when a garbage collection operation is needed; and the valid target key data may be filtered quickly and accurately from the respective first key data according to the second key data stored in the second data table, and thus the invalid first key data is filtered out. Reading of the target value data corresponding to the target key data in the first data table according to the storage location information indicated in the first index entries may achieve reading of valid key-value pair data in the first data table without the need to read invalid key-value pair data in the first data table, thus reducing the data reading amount, and improving the data reading speed. Finally, a new first data table is constructed according to the valid target key data and the corresponding target value data in the first data table, which can realize the rapid construction of the first data table including the valid key-value pair data. The collection of the first data table to be processed may realize quick collection of invalid key-value pair data and realize real-time collection of storage space occupied by the invalid key-value pair data in the first data table to be processed. Since the reading of the invalid key-value pair data is not needed in the entire process of garbage collection, the data reading amount may be effectively reduced, thereby accelerating garbage collection and improving the efficiency of garbage collection.

Optionally, on the basis of the above embodiment, the second data table may be a data table with an index information decoupled structure, i.e., the second data table may be a DTable, and in this case, the above S302 may be implemented in accordance with the following steps.

S3021, traversing, with respect to any one of the first key data, the respective second data tables sequentially in accordance with a hierarchy to which the respective second data table belongs in the log-structured merge tree to determine a second data table associated with the first key data.

In this embodiment, the second data table associated with the first key data is the second data table including the second key data identical to the first key data. Moreover, if there exists multiple second data tables including the second key data identical to the first key data, the second data table associated with the first key data is a second data table that is traversed first among the multiple second data tables, i.e., in the multiple the second data tables, the node to which it belongs is located at the highest level of the hierarchy of the log-structured merge tree. For example, in response to that the second data table including the second key data identical to the first key data is a second data table 1 at the level $L_0$, a second data table 3 at the level $L_1$, and a second data table 10 at the level $L_3$, it is determined that the second data table 1 at the level $L_0$ is the second data table associated with the first key data.

In a specific implementation, for any of the first key data, the respective second data tables may be traversed, from top to bottom, in accordance with a hierarchy to which the respective second data tables belong in the log-structured merge tree until a first second data table including the second key data identical to the first key data is traversed as the second data table associated with the first key data, and at this point, the traversal may be discontinued.

Optionally, at least one second data table associated with the first data table may also be determined from the multiple second data tables, according to the respective first key data in the first data table, from high to low, in accordance with a hierarchy to which the respective second data tables belong in the log-structured merge tree. Valid target key data in the first key data may then be determined according to the second key data in the respective second data table associated with the first data table.

S3022, reading a first target index data block from the second data table associated with the first key data, wherein the first target index data block comprises multiple second index entries, the second index entries are first type of index entries and/or second type of index entries, the first type of index entries are indexes associated with the second key data and table indexes of the first data table in which the first value data corresponding to the second key data is located, the second type of index entries are index entries associated with third key data and storage location information of key-value pair data corresponding to the third key data in the second data table, the key-value pair data corresponding to the third key data has a data volume less than a preset data volume, and the key-value pair data corresponding to the second key data has a data volume greater than or equal to the preset data volume.

In this embodiment, the second key-value pair data is the large key-value pair data, and the key-value pair data corresponding to the third key data is the small key-value pair data, which is later represented by sixth key-value pair data.

The existing key-value separated LSM-tree key-value storage system directly uses the traditional LSM-tree as a storage structure for index data, which typically stores index data of the large key-value pair data and small key-value pair data in a hybrid manner, and such a hybrid storage layout significantly reduces the GCefficiency, especially when the hybrid storage of large and small key-value pair data is more prevalent under the variable-length load, it will significantly increase the time overhead of GC-Lookup. For the GC-Lookup operation, it is often not necessary to check the small key-value pair data stored in the LSM-tree, so a new data table format for index information storage is proposed in this solution, i.e., index decoupled table (DTable). That is, a second data table with an index decoupled storage structure is proposed in the embodiment of the present disclosure.

A first target index data block may be included in the second data table. Multiple second index entries may be included the index block. One of the second index entries may be an index entry associated with a table index of the first data table in which the second key data and the corresponding first value data are located, and may also be an index entry associated with third key data and a storage location of key-value pair data corresponding to the third key data in the second data table. The table index of the first data table may specifically be a file number (File Number) of the first data table. Here, since the second key data in the second data table must be the key data corresponding to the large key-value pair data after the key-value separation, the value data corresponding to the second key data is required to be stored in a first data table, and accordingly the value data corresponding to the second key data may be the first value data. The key-value pair data corresponding to the third key-value data is sixth key-value pair data, and an index entry associated with the storage location of the sixth key-value pair data in the second data table may specifically be an offset location of the data block corresponding to the sixth key-value pair data in the second data table.

The first target index data block may be a hybrid index block in which two types of second index entries are stored. One type refers to the key data in the large key-value pair data and a table index of the first data table in which the value data corresponding to the key data is located; i.e., a piece of index data corresponds to an index associated with a piece of large key-value pair data. The other type refers to the key data in the small key-value pair data and a start offset location of a data block corresponding to the key-value pair data in the second data table. Multiple small key-value pair data can form a data block in the second data table, which is used for storing the small key-value pair data; that is, a piece of index data corresponds to a data block that contains all small key-value pair data.

For the second data table, metadata information of the second data table may also be maintained in the second data table. The metadata information may include Filter information, Meta index information, and Footer information of the data table. The effect of the metadata information in the second data table is similar to that of the metadata information in the first data table, and will not be repeated herein.

FIG. 6 shows a schematic structural diagram of a second data table according to an embodiment of the present disclosure. Data blocks refer to the respective small key-value pair data (KV) for storage. Three data blocks are shown in FIG. 6, each of which includes three small key-value pair data. A hybrid index block (HIB) refers to a first target index data block, which includes two types of index entries. The first type of index entries refers to second key data (K) and a table index (i.e., file number, identified with F in FIG. 6) of first value data corresponding to the key data in the first data table. The second type of index entries refers to index entries associated with third key data and a storage location of six key-value pair data corresponding to the third key data in the second data table, herein the index entry may refer to an offset location of a data block corresponding to the six key-value pair data (this type of index entries is represented with blank squares in FIG. 6). In addition, metadata information of the second data table, i.e., filter information, meta index information, and footer information, is also illustrated in FIG. 6.

In a specific implementation, after the second data table associated with the first key data is determined, a first target index data block in the second data table can be located, i.e., the respective second index entry can be located, according to the metadata information of the second data table. Here, since the validity check operation (GC-Lookup operation) in the GC operation may directly access the hybrid index block without accessing the data block corresponding to the small key-value pair data, the data validity check can be performed with a low I/O overhead. Moreover, the hybrid index block still ensures the internal orderliness of the data table, that is, in the hybrid index block still maintains the global valid view of the data table, thus avoiding the performance impact on the foreground data-read operation.

S3023, determining, in response to the multiple second index entries with the first type of index entries, whether second key data matching the first key data exists according to the second key data in the first type of index entries.

Here, the second key data matched with the first key data may specifically be the second key data that has the same data content as the first key data, and has the corresponding table index the same as the file number of the first data table in which the first key data is located.

In a specific implementation, after the first target index data block is located, whether the second key data matched with the first key data exists may be determined from the second key data in the respective second index entry by means of binary lookup. That is, based on the second key data in the respective second index entries, whether the first key data is valid data is determined by means of bisection lookup. In this way, the validity check of the first key data can be realized by using the second index entries in the first target index data block, without the need to read the data block in which the small key-value pair data is located in the second data table, thus realizing the execution of the GC-Lookup operation with lower I/O overhead, and achieving the purpose of accelerating the GC.

S3024, taking the first key data as the target key data in response to determining that second key data matching the first key data exists.

In a specific implementation, in response to that it is determined that there exists second key data matched with the first key data, the first key data can be determined as the latest key data and also valid key data, and therefore the first key data can be used as the target key data.

Conversely, in response to that it is determined that there exists no second key data matched the first key data, the first key data can be determined as invalid key data, the key data and the corresponding value data need to be deleted, and the storage space occupied by it needs to be released, thereby realizing garbage collection.

Illustratively, by the above steps S3021-S3024, the validity check of the respective first key data in the first data table to be processed may be implemented so as to select the valid respective target key data therefrom.

In one embodiment, in order to further improve the GC efficiency, a drop cache (DropCache) may also be set up in the memory in advance, and a set of key data with a hot data feature may be buffered in the DropCache. The collection includes the buffered key data that has been buffered, and each of the buffered key data is key data repeatedly written multiple times. The construction process of the key data collection will be described later. In this case, before the step S302 is performed, the target key data may be determined by the following steps.

S1, determining, with respect to any one of the first key data, whether matched key data matching the first key data exists from buffered key data with a hot data feature that is contained in a set of key data buffered in a memory, wherein the hot data feature is used for indicating that the buffered key data is key data repeatedly written multiple times.

Here, the key data collection buffered in the memory can be stored in the DropCache, and the buffered key data is the key data buffered in the DropCache. Matched key data refers to the buffered key data that is consistent with the first key data. The DropCache can use a Least Recently Used (LRU) algorithm to manage cache obsolescence, i.e., it can use LRU algorithm to manage the buffered key data in the DropCache. The hot data feature used to indicate that the buffered key data is data that has been repeatedly written to the data table multiple times.

In a specific implementation, it may be determined whether there is a non-empty set of key data buffered in the DropCache of the memory. If there is no non-empty set of key data buffered in the DropCache of the memory, it may be determined that none of the buffered key data currently exists in the DropCache of the memory, and accordingly the step S302 may be performed directly to determine the target key data without making a distinguish between hot and cold. If there is a non-empty set of key data buffered in the DropCache of the memory, the respective buffered key data included in the set of buffered key data in the DropCache may be obtained, and whether there exists matched key data consistent with the first key data may be found from the buffered key data. If the matched key data identical to the first key data exists in the buffered key data, the following step S2 is performed; and if the matched key data identical to the first key data does not exist in the buffered key data, the above step of S302 may be performed to determine whether the first key data may be used as the target key data.

S2, determining whether the matched key data and the first key data are the same version in response to that there exists the matched key data matched with the first key data.

In this embodiment, each key-value pair data may have a corresponding unique data version number when it is written, and the data version number corresponding to a key-value pair data is also the data version number corresponding to the key data and the value data in that key-value pair data. For example, if 100 key-value pair data are written, each of the 100 key-value pair data has a corresponding unique data version number, regardless of whether or not there is a duplication of key data, a duplication of value data, or a duplication of key-value pair data in the 100 key-value pair data.

In a specific implementation, after the matched key data corresponding to the first key data is determined, it can be determined whether the data version number of the first key data and the data version number of the matched key data are consistent. If the data version number of the first key data and the data version number of the matched key data are inconsistent, it is determined that the matched key data and the first key data are of the different versions, and the following step S3 may be performed. If the data version number of the first key data and the data version number of the matched key data are consistent, it is determined that the matched key data and the first key data are of the same version and the first key data can be directly used as the valid target key data, and there is no need to determine whether the first key data is the valid target key data by the above step S302.

S3, determining that the first key data is invalid key data in response to that the matched key data and the first key data are not the same version.

In a specific implementation, in response to that the data version number of the matched key data and the data version number of the first key data are inconsistent, it can be directly determined that the first key data is invalid key data, and the value data corresponding to the first key data is also invalid value data, and there is no need to determine whether the first key data is valid target key data by the step S302.

In this way, based on the above steps S1-S3, the first key data can be preliminarily filtered using the set of key data, from which the first key data that does not have matched key data, the invalid key data, and part of the target key data are filtered out. The first key data in which no matched key data exists is cold key data, which may also include valid target key data or invalid key data.

Thereafter, in the above step S302, the valid target key data may be filtered out from the first key data in which the matched key data does not exist, according to the respective second key data stored in the respective second data table.

Illustratively, after the first key data is filtered initially utilizing the set of key data, by the step S302, the filtered first key data with no matched key data may be further filtered, so as to filter the valid target key data therefrom. Then, the target key data filtered utilizing the set of key data and the target key data filtered by the step S302 may be used together as the final filtered valid target key data.

In one embodiment, since the buffered key data in the set of key data buffered in the Drop Cache must be key data with the hot data feature, if certain target key data has matched key data, it can be determined that the target key data must also be key data with the hot data feature; conversely, if certain target key data has no matched key data, it can be determined that the target key data must be key data with the cold data feature, where the cold data feature is used to indicate that the key data is key data written once. Thus, by means of the set of key data and the second data table, not only can the respective valid target key data be filtered out, but the hot and cold features of the individual target key data can be determined. Further, the hot and cold features of the target key data can be utilized for constructing a new first data table with hot and cold feature. Specifically, the target key data may all have matched key data, or none of them may have matched key data, or some of them may have matched key data and some of them may not. The target key data with the matched key data may be used as hot key data with the hot data feature, and/or, to the target key data not have the matched key data is used as cold key data with the cold data feature. The cold data feature is used for indicating that the cold key data is key data written once.

Then, a new first data table with the hot data feature may be constructed according to the respective hot key data and target value data corresponding to the hot key data, and/or, a new first data table with the cold data feature may be constructed according to the respective cold key data and target value data corresponding to the cold key data. In this way, hot and cold splitting of key-value pair data can be realized. Since the essence of GC operations in key-value separated LSM-tree key-value storage systems is to collect space wasted by repeatedly written hot data, but because hot and cold data are usually mixed and stored together, this leads to repeated reads and writes of cold data in the execution of GC, resulting in unnecessary I/O overhead. To this end, an embodiment of the present disclosure provides a lightweight hotspot-aware data flush and garbage collection strategy to achieve hot and cold separated storage of data. Specifically, in the data collection method provided in the embodiments of the present disclosure, two processes may exist to realize the hot and cold separation of data. One process refers to constructing a first data table with cold data feature depending on whether the target key data has matched key data after the execution of a GC operation, and the other process refers to constructing during the data flush process, which will be described in more detail below.

In one embodiment, based on the above embodiment, it can be seen that the first data table may have a cold data feature or a hot data feature. In this case, the above step S301 may be implemented by the following steps.

S3011, determining, in response to the garbage collection request, multiple first data tables.

In a specific implementation, in response to the garbage collection request initiated by a background thread, multiple first data tables with a garbage rate reaching a preset threshold may be determined from the multiple first data tables stored in the Disk. Here, the determined multiple first data tables may include only data tables with a hot data feature, or may include data tables with a hot data feature and data tables with a cold data feature.

S3012, selecting a first data table with a hot data feature from the multiple first data tables.

In a specific implementation, according to the hot and cold data features of each first data table, first data tables with a hot data feature may be filtered out from the multiple first data tables, and these first data tables may be used as the first data tables to be processed and to be subjected to GC processing preferentially. Moreover, first data tables with a cold data feature may be filtered out, or the remaining first data tables maybe identified as first data tables with a cold data feature. For the time being, there is no need to perform GC processing on these first data tables with the cold data feature. In this way, the participation of cold data in the GC can be minimized, thereby fully utilizing the I/O bandwidth of the storage device.

S3013, taking the filtered first data table with the hot data feature as the first data table to be processed, and determining the respective first index entries from the first data table to be processed.

In a specific implementation, for each first data table with hot data feature as a first data table to be processed, the respective first index entries may be determined therefrom, and the above steps S302-S304 may be performed, thereby realizing garbage collection of the first data table to be processed.

Further, after garbage collection is performed on all the first data tables to be processed, i.e., after garbage collection is performed on all the first data tables with the hot data feature, the first data table with the cold data feature may be taken as a new first data table to be processed. Return to the step of determining the respective first index entries from the first data table to be processed (or may not perform).

Illustratively, after garbage collection is performed on all of the first data tables to be processed and with the hot data feature, in order to avoid excessive garbage data in the first data tables with the cold data feature, the first data table with the cold data feature may be used as a new first data table to be processed. Return to perform the above steps S301-S304 to realize garbage collection of the first data table with the cold data feature.

In one embodiment, in order to further improve the GC efficiency, for S3013, the following steps may also be implemented.

S30131, determining whether the respective first index entries associated with the first data table to be processed are pre-buffered in the memory.

In this embodiment, it is possible to read the respective first index entries of the respective first data table from all the first data tables, or read the respective first index entries thereof only for the first data table to be processed, before performing the current GC operation. Specifically, since the respective first index entries of each first data table are stored in the indexed data block, it is possible to read the index blocks of the respective first data tables, or read its index block only for the first data table to be processed.

In a specific implementation, in order to improve the GC efficiency, the index blocks that have been read from the first data table can be buffered in the memory. After the first data table to be processed is determined, it may be determined whether respective first index entries associated with the first data table to be processed are buffered in the memory. Specifically, it may be determined whether a second target index data block associated with the first data table to be processed is buffered in the memory (the second target index data block is also known as the index block of the first data table that is buffered in the memory in advance). If the second target index data block exists, the first key data in the respective first index entries may be obtained directly, for example, the respective first key data is obtained from the respective first index entries included in the second target index data block, without with to read the first index entries from the first data table to be processed. If not, the following S30132 may be performed.

S30132, determining the respective first index entries from the first data table to be processed in response to that the respective first index entries associated with the first data table to be processed are not pre-buffered in the memory; and buffering the respective first index entries in the memory.

Illustratively, in response to that the second target index data block associated with the first data table to be processed is not buffered in the memory, the respective first index entries may be read from the first data table to be processed according to the metadata information of the first data table to be processed.

Further, after the respective first index entries are determined from the first data table to be processed, the respective first index entries may be stored in the memory, and specifically, the index block of the first data table may be buffered in the memory. In this way, the respective first index entries (or the index block) of the first data table to be processed may be buffered, and when the GC operation of the first data table to be processed is performed again in a subsequent period, the respective first index entries may be obtained directly from the memory, without with to read it again in the first data table to be processed, thus effectively improving the data acquisition efficiency.

Optionally, in order to further improve the GC efficiency, for any first data table, after the target key data and the target value data are read from the first data table, the target key-value pair data consisting of the target key data and the target value data may also be buffered in the memory. In this way, after the target key data is subsequently filtered out from the first key data, the target value data corresponding to the target key data may be read directly in the memory without with to read it in the first data table, thereby further improving the efficiency of the GC operation.

Optionally, for the first target index data block in the second data table, if a certain first target index data block has been read first, it may also be pre-buffered in the memory. In this way, for S3022, the following steps may also be performed.

Whether the first target index data block associated with the second data table is buffered in the memory is determined, if so, then S3023 and S3024 are performed by utilizing the first target index data block buffered in the memory; if not, then the first target index data block is read from the second data table associated with the first key data, and S3023 and S3024 are continued to perform.

Meanwhile, after the first target index data block is read from the second data table associated with the first key data, the first target index data block may be buffered in the memory. In this way, in the subsequent process of utilizing the second data table to filter the target key data, the first target index data block may first be attempted to be obtained from the memory and thus the respective second index entries are obtained, thereby realizing the selecting of the first key data without with to read it in the second data table, and further improving the efficiency of the GC operation.

In one embodiment, with respect to the key-value separated LSM-tree key-value storage system with the RTable structured vSST and the DTable structured kSST provided by the embodiments of the present disclosure, the method may further include the step of performing data write and data flush in the key-value storage system. Specifically, the data write and the data flush may be performed by the following steps T1-T3.

T1, receiving a data write operation instruction to determine key-value pair data to be stored.

Here, the data write operation may be a user-initiated operation of writing key-value pair data of any length, and the key-value pair data to be stored is the key-value pair data written corresponding to the data write operation.

Illustratively, a user-initiated data write operation instruction may be received, the key-value pair data to be stored written by the user may be obtained, and the key-value pair data to be stored may be written to a memory table (Memtable).

T2, selecting, in response to the data volume of the determined key-value pair data to be stored reaching a data volume threshold, third key-value pair data with a data volume greater than or equal to a preset data volume and fourth key-value pair data with a data volume less than the preset data volume from multiple key-value pair data to be stored.

Here, the data volume threshold may be determined based on the storage space of the memory table. The third key-value pair data, i.e., the large key-value pair data, needs to be stored in the first data table and the second data table in a key-value separated structure, and the fourth key-value pair data, i.e., the small key-value pair data, may be stored directly in the second data table.

In a specific implementation, in response to that the data volume of the key-value pair data to be stored reaches the data volume threshold, that is, in response to that the data volume of the key-value pair data to be stored in the Memtable has reached a space threshold corresponding to the storage space of the Memtable, the state of the Memtable can be changed to a read-only state, that is, the Memtable will become an Immutable Memtable. Then, a new Memtable is created for receiving the subsequent data write operation. Moreover, a flush operation will be performed on the key-value pair data to be stored in the Immutable Memtable, and the data will be stored in the first and second data tables constructed in the disk in a key-value separated structure. Specifically, for the flush operation, third key-value pair data and fourth key-value pair data may be determined from the key-value pair data to be stored in the Immutable Memtable.

It should be noted that the key-value pair data to be stored may include only the third key-value pair data, only the fourth key-value pair data, or both the third key-value pair data and the fourth key-value pair data.

T3, constructing a new first data table according to the third key-value pair data; and constructing a new second data table according to the fourth key-value pair data, and table indexes of the first data table in which key data in the third key-value pair data and value data in the third key-value pair data are located.

In a specific implementation, after the third key-value pair data and the fourth key-value pair data are determined, a new first data table may be constructed according to the third key-value pair data, in accordance with a table structure of the first data table, and a new second data table may be constructed according to the fourth key-value pair data, and table indexes of the first data table in which key data in the third key-value pair data and value data in the third key-value pair data are located. The new first data table includes the third key-value pair data, an index entry consisting of the key data in the third key-value pair data and a storage location of the third key-value pair data, and metadata information. The new second data table includes a data block corresponding to the fourth key-value pair data, an index block consisting of key data in the third key-value pair data, a table index of the first data table in which the value data in the third key-value pair data is located, key data in the fourth key-value pair data, and an offset location of the data block corresponding to the fourth key-value pair data, and metadata information.

It should be noted that for the three different cases in which the key-value pair data to be stored may include only the third key-value pair data, or may include only the fourth key-value pair data, or may include both the third key-value pair data and the fourth key-value pair data, the specific implementations in the step T3 may be adaptively changed according to the different cases. For example, if the key-value pair data to be stored includes only the third key-value pair data, the new second data table does not include the data block corresponding to the fourth key-value pair data, the index block does not include the index block consisting of the key data in the fourth key-value pair data and the offset location of the data block corresponding to the fourth key-value pair data, and the other cases will not be repeated here.

In one embodiment, in order to realize the distinction between hot and cold data, the above step T3 may also be implemented by the following steps.

T31, obtaining a set of key data buffered in the memory, wherein the set of key data includes at least one piece of buffered key data with a hot data feature, the hot data feature is used for indicating that the buffered key data is key data repeatedly written multiple times.

In a specific implementation, after the third key-value pair data is determined, it may be determined whether the set of key data is buffered in the DropCache of the memory; and if the set of key data is not buffered in the DropCache of the memory, the respective third key-value pair data may be used as data with the cold data feature, and a new first data table with the cold data feature may be constructed according to the third key-value pair data. If the set of key data is buffered in the DropCache of the memory, the set of key data buffered in the DropCache may be obtained.

T32, selecting fifth key-value pair data with matched buffered key data from the third key-value pair data.

Here, the fifth key-value pair data is the third key-value pair data in which there exists consistent buffered key data for the key data in the set of key data. For example, if the buffered key data includes K4, K5, and K6, and the key data in the respective third key-value pair data are K4, K5, and K7, respectively, the third key-value pair data including K4 and the third key-value pair data including K5 may be determined to be the fifth key-value pair data.

Understandably, if no fifth key-value pair data is filtered out from the third key-value pair data, it may be determined that the third key-value pair data are all data with a cold data feature, and therefore, a new first data table with the cold data feature may be constructed according to the respective third key-value pair data.

T33, constructing a new first data table with the hot data feature according to the fifth key-value pair data; and constructing a new first data table with a cold data feature according to key-value pair data in the third key-value pair data other than the fifth key-value pair data.

Here, the respective fifth key-value pair data filtered out are data repeatedly written many times and have the hot data feature, so that a new first data table with the hot data feature may be constructed according to the respective fifth key-value pair data. Meanwhile, the key-value pair data other than the fifth key-value pair data in the third key-value pair data may be regarded as data written for the first time and has the cold data feature, so that a new first data table with the cold data feature may be constructed according to the key-value pair data other than the fifth key-value pair data in the third key-value pair data.

It should be noted that in selecting the fifth key-value pair data in which there exists matched buffered key data, if all of the third key-value pair data are the fifth key-value pair data, it is only required to construct a new first data table with the hot data feature according to the fifth key-value pair data, there is no key-value pair data other than the fifth key-value pair data, and it is not required to construct a new first data table with the cold data feature.

In one embodiment, with respect to respective second data table with a log-structured merge tree structure in the Disk, a data compaction operation may also be performed on these data tables to improve overall orderliness of the data so as to ensure read performance. In this case, after the new second data table is constructed, it is further possible to perform the compaction operation in the following steps, and construct and update the set of key data according to the compaction operation:

in response to an data table compaction operation instruction, performing a data compaction operation on at least part of the constructed second data tables of the log-structured merge tree to obtain a merged second data table, where table indexes in second index entries corresponding to second key data in the merged second data table are determined according to a first data table in which value data corresponding to the second key data is located at the time it is last written.

Here, the value data corresponding to the second key data at the time it is last written is most recently written value data corresponding to the key data. For example, for the key-value pair data K1V1 and K1V2, in response to K1V2 being written later than K1V1, after performing the compaction operation for the second data table corresponding to K1V1 and the second data table corresponding to K1V2, the table index corresponding to K1 will eventually be a file number of the first data table where V2 is located. The constructed second data table is the second data table that has been constructed and stored in the Disk.

Illustratively, in response to a data table compaction operation instruction, respective constructed target second data tables, such as a constructed second data table at an adjacent hierarchical level, for which a data table compaction operation needs to be performed, may be determined from the second data table of the log-structured merge tree, and then a data compaction operation may be performed with respect to these constructed target second data tables, deriving one merged second data table; meanwhile, after the merged second data table is derived, the respective constructed target second data tables (the target second data tables prior to compaction) may be deleted, thereby realizing the release of storage space.

Further, the set of key data in the DropCache of the memory may be updated with the second key data in the merged second data table.

Here, in response to there being no set of key data buffered in the DropCache of the memory, a set of key data may be constructed and buffered into the DropCache of the memory according to the second key data in the merged second data table; in response to there being a set of key data buffered in the DropCache of the memory, the buffered key data in the DropCache buffered set of key data may be updated according to the second key data in the merged second data table.

In this way, an embodiment of the present disclosure proposes a lightweight hotspot-aware data flush and garbage collection strategy to achieve hot and cold separated storage of data, which utilizes the principle of generating garbage data, i.e., when the second data table in the LSM-tree executes the compaction operation, data that has undergone compaction during the process is recorded, which means that the data has been written at least two times, and thus, it may be considered as data with the hot data feature. By recording this type of hot data in the DropCache, a set of hot data for the running process is obtained. Based on this set of hot data, an embodiment of the present disclosure makes full use of this set of hot data in executing operations associated with writing key-value pair data, i.e., in the process of a key-value separated LSM-tree executing flush and garbage collection, a direction of flow of the data is decided by judging whether or not the current data is hot data, so as to achieve hot and cold data flow splitting. After data flush or garbage collection is executed, the corresponding data table with the cold data feature and data table with the hot data feature are also generated, and the subsequent GC operation will preferentially select the data table with the hot data feature for the GC operation, so as to minimize participation of the data with the cold data feature in the GC, and thus to make full use of the I/O bandwidth of the storage device.

In one embodiment, the existing key-value separated LSM-tree key-value storage system tends to ignore the size of space actually used during running, and if the size of space actually used exceeds the size of storage space actually allocated, unavailability of services would be caused. In many cost-sensitive scenarios, space amplification is an issue that needs to be handled with care, especially for key-value separated LSM-tree key-value storage systems that are themselves systems sacrificing space for foreground performance. To this end, an embodiment of the present disclosure also proposes a space-aware throttling strategy to limit expansion of space amplification. Specifically, the space-aware throttling strategy proposed by the embodiment of the present disclosure restricts a data write request of the foreground by limiting the size of space actually used by the key-value separated LSM-tree during running, and at the same time pro-actively scheduling a background GC thread to collect the storage space in a timely manner. Specifically, the space-aware throttling strategy may be implemented in the following steps.

P1, determining a total size of storage space currently used by the log-structured merge tree and all the first data tables.

In a specific implementation, the actual space size currently occupied by the key-value storage system of LSM-tree, i.e., the total storage space currently occupied by the log-structured merge tree as well as all of the first data tables, may be calculated during the process of executing the compaction operation for the second data table and/or during the process of executing the GC operation for the first data table.

P2, adjusting a receiving frequency of a data write operation according to the total size of storage space and a preset space threshold.

Here, the preset space threshold may be preset according to the size of a data set to be written and the capacity of the Disk, which is not specifically limited in the embodiments of the present disclosure.

In a specific implementation, it is possible to judge a size relationship between the total size of storage space and the preset space threshold, and adjust the receiving frequency of the data write operation according to the size relationship.

For example, in response to the total size of storage space reaching a preset space threshold, the data write operation of the foreground may be speed-limited, thereby reducing the receiving frequency of the data write operation; in response to the total size of storage space not reaching the preset space threshold, it may be possible to ensure that the data write operation of the foreground is unchanged, thereby ensuring that the data write operation is received at the current receiving frequency.

In one embodiment, the preset space threshold may include two thresholds, a first preset space threshold and a second preset space threshold, where the second preset space threshold is greater than the first preset space threshold, and optionally, the first preset space threshold is greater than or equal to the size of the data set to be written, and the second preset space threshold is less than or equal to the capacity of the Disk.

In a specific implementation, it may be possible to adjust the receiving frequency of the data write operation according to the size relationship between the total size of storage space and the first preset space threshold and second preset space threshold.

Specifically, in response to the total size of storage space reaching the first preset space threshold, it may be possible to determine a receiving frequency reduction value of the data write operation, and then control the receiving frequency of the data write operation according to the receiving frequency reduction value.

Here, the receiving frequency reduction value is used for indicating a reduction in the receiving frequency for the data write operation.

In a specific implementation, in response to the total size of storage space reaching the first preset space threshold, it may be indicated that a certain amount of storage space has currently been used, and in order to ensure a performance balance between the GC operation and the data write operation, the data write operation may be speed-limited, and accordingly, the receiving frequency reduction value for the data write operation may be calculated according to a difference between the total size of storage space and the first preset space threshold as well as the current receiving frequency. Then, the data write operation of the foreground may be speed-limited according to the receiving frequency reduction value, thereby reducing the receiving frequency of the data write operation, and enabling the control of the receiving frequency of the data write operation.

Alternatively, the receiving of the data write operation is stopped in response to the total size of storage space reaching the second preset space threshold.

Illustratively, in response to the total size of storage space reaching the second preset space threshold, it may be indicated that a large amount of storage space has currently been used, and in order to ensure that there can be sufficient storage space for the GC operation, the receiving of the data write operation may be stopped, i.e., the stopping of the writing of the foreground may be triggered to ensure that the GC of the background can keep up with it.

In response to the total size of storage space not reaching the first preset space threshold, the receiving frequency of the data write operation may not be adjusted.

In one embodiment, a thread number of garbage collection threads may further be adjusted according to the size relationship between the total size of storage space and the first preset space threshold and second preset space threshold, and the garbage collection threads are used for executing a garbage collection operation against the at least one first data table.

In response to the total storage space not reaching the first preset space threshold, a first thread number of the garbage collection threads is determined; alternatively, in response to the total storage space reaching the first preset space threshold, a second thread number of the garbage collection threads is determined, where the second thread number is larger than the first thread number; alternatively, in response to the total storage space reaching the first preset space threshold, a third thread number of the garbage collection threads is determined, where the third thread number is greater than the second thread number. That is, as the total storage space increases, the thread number of the garbage collection threads is increased to ensure that the garbage collection is accelerated, and the total size of storage space consumed by the entire system is limited to be within a set threshold, thereby ensuring that the space amplification is fixed and avoiding storage space leakage.

Optionally, in response to the total size of storage space reaching the first preset space threshold, a maximum thread number of the garbage collection threads may further be determined; then the number of garbage collection threads may be controlled in accordance with the maximum thread number; in response to the total size of storage space not reaching the first preset space threshold, the maximum thread number of the garbage collection threads may be preset, and then the garbage collection GC operation may be executed on at least one data table with garbage collection threads not greater than the maximum thread number, e.g., employing a single thread.

Figure 7:
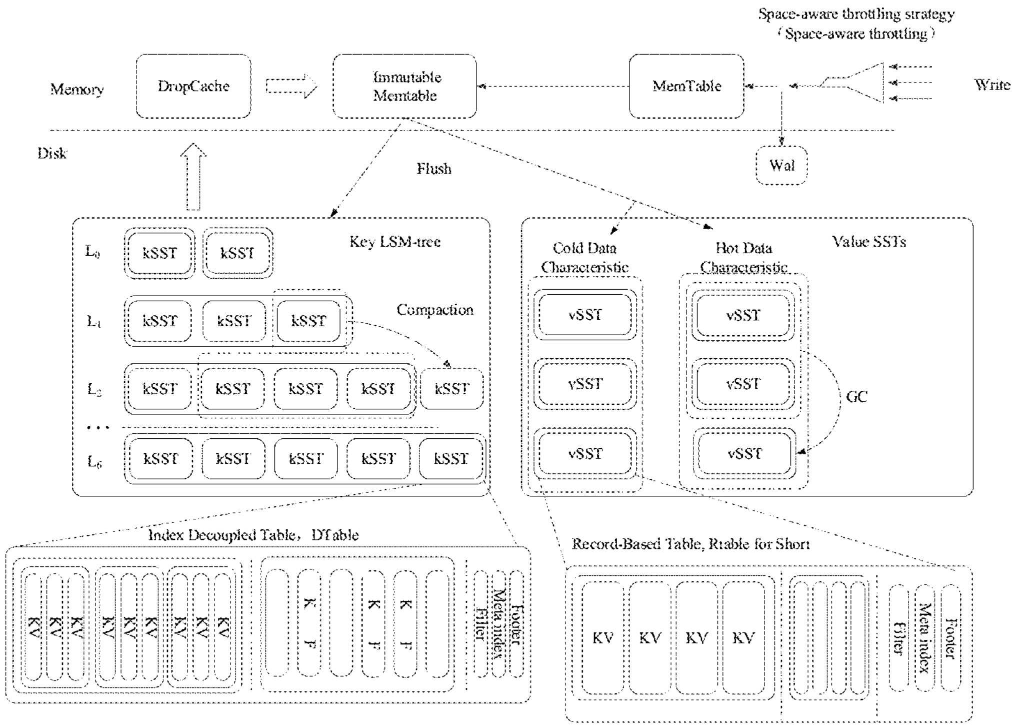
FIG. 7 shows a schematic structural diagram of a key-value storage system corresponding to a data collection method according to an embodiment of the present disclosure.

FIG. 7 shows a schematic structural diagram of a key-value storage system corresponding to a data collection method according to an embodiment of the present disclosure. The key-value storage system corresponding to the data collection method according to the embodiment of the present disclosure may be referred to as a scavenger system. Specifically, with respect to a data write operation by the user, space-aware throttling may be utilized to perform a receiving restriction for the write operation. After respective key-value pair data to be stored corresponding written by the data write operation is acquired, the key-value pair data to be stored may be stored in a Memtable. In response to that the data amount of the key-value pair data to be stored that is stored in the Memtable has reached the space threshold corresponding to the storage space of the Memtable, the Memtable becomes an Immutable Memtable in a read-only state. Then, with respect to the Immutable Memtable, a data flush operation may be executed to write the key-value pair data to be stored into the first data table and the second data table. The execution of the flush operation will rely on the set of key data stored in the DropCache. In FIG. 7, the respective second data tables with the Log-Structured Merge Tree (Key LSM-tree) forms the Key LSM-tree, the Key LSM-tree includes 7 layers of second data tables (i.e., L0-L6, layers L3-L5 are omitted from FIG. 7), two second data tables (kSSTs) are included in the layer L0, three second data tables (kSSTs) are included in the layer L1, four second data tables (kSSTs) are included in the layer L2, and five second data tables (kSSTs) are included in the layer L6, where the respective second data tables (kSSTs) in the layers L0-L6 are all the index-decoupled tables (DTable for short) illustrated at the bottom of FIG. 7. With respect to the Key LSM-tree, the rightmost kSST in the layer L1 and the middle three kSSTs in the Layer L2 send a data table compaction operation to obtain the merged second data table, i.e., the rightmost one kSST in the layer L2. With respect to the data flush operation, in constructing the first data table according to the key-value pair data to be stored, the first data table (vSST) with the hot data feature (hot) and the first data table (vSST) with the cold data feature (cold) will be constructed according to the set of key data stored in the DropCache. In FIG. 7, there are three first data tables (vSSTs) with the hot data feature included, and three first data tables with the cold data feature also included, and the respective first data tables form a set of ordered table files of value data (i.e., Value SSTs), and each of the first data tables (vSSTs) in FIG. 7 is a record based table (Rtable for short) illustrated at the bottom of FIG. 7. Furthermore, in FIG. 7, among the first data tables (vSSTs) with the hot data feature, a garbage collection (GC) operation executed against the upper two first data tables with the hot data feature yields a new first data table with the hot data feature at the bottom. Wal represents a pre-write log for characterizing consistency of data.

In order to further embody the improvement in GC efficiency brought about by the data collection method provided by the embodiments of the disclosure, a test environment was constructed with a same processor, a same memory, a same operating system, and a same storage medium to experimentally test the data collection method. Specifically, the experiments provided by the disclosed embodiments limit the space size to 1.5 times the size of the data set to be written, i.e., 150 GB. Testing were conducted using a YCSB load, with the length of each key data set to 24 bytes and the length of each value data set to 16 KiB. We performed testing using the YCSB load, where the zipfian factor for each load was set to 0.99 and the composition of operations for each load is shown in Table 1 below:

TABLE 1

| Operation Type | Load | Update | Type A | Type B | Type C | Type D | Type E | Type F |
|---|---|---|---|---|---|---|---|---|
| Search | | | 50% | 95% | 100% | 95% | | 50% |
| Insert | 100% | | | | | 5% | 5% | |
| Update | | 100% | 50% | 5% | | | | |

TABLE 1-continued

| Operation Type | Load | Update | Type A | Type B | Type C | Type D | Type E | Type F |
|---|---|---|---|---|---|---|---|---|
| Scan | | | | | | | 95% | 50% |
| Read-modify-write (rmw) | | | | | | | | |

YCSB is a database performance test tool mainly used at cloud or a server that is implemented in Java language; the magnitude of the zipfian factor is used to decide the degree of significance of the hot and cold features of the load. An unassigned position may be null, and type A-type F may be any operation type.

Objects under comparison may include a RocksDB key-value storage system, a BlobDB key-value storage system, a Titan key-value storage system, and a TerarkDB key-value storage system in the prior art. The BlobDB key-value storage system, the Titan key-value storage system, and the TerarkDB key-value storage system are all existing LSM-tree key-value storage systems using key-value separation.

Figure 8:
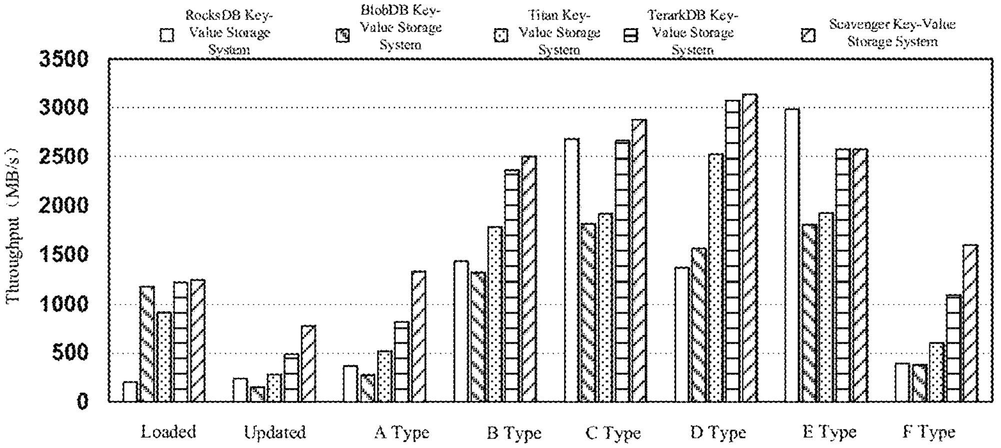
FIG. 8 shows a schematic diagram of throughput comparison of respective key-value storage systems under a fixed-length load of 16 KB according to an embodiment of the present disclosure.
Figure 9:
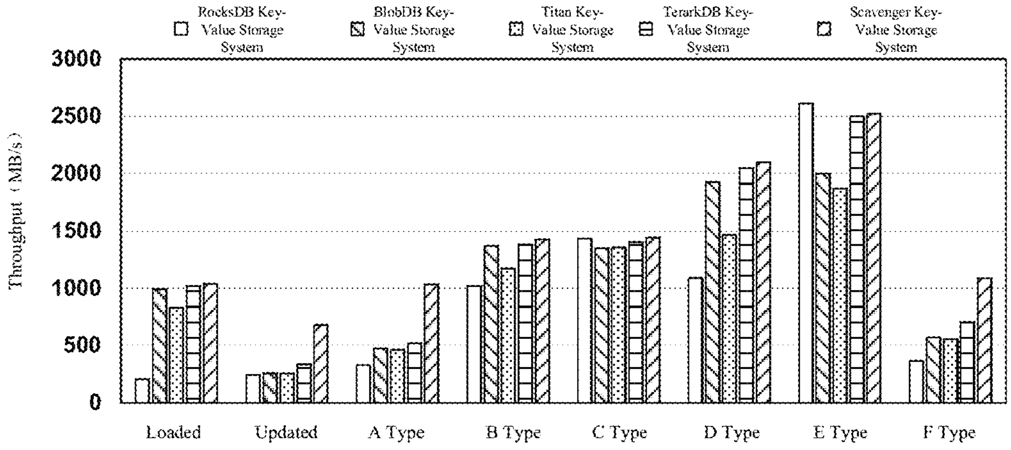
FIG. 9 shows a schematic diagram of throughput comparison of respective key-value storage systems under a mixed load of 8 KB according to an embodiment of the present disclosure.

First, a throughput test was conducted, in which 100 GiB of data was first inserted for warm-up, and then an Update load was executed to perform an update operation on these 100 GiB key-value pairs, with a total of 300 GiB of data updated. Subsequent YCSB types A-F were all tested on the data set after Update 300 G, using fixed-length and variable-length loads, respectively. FIG. 8 shows a schematic diagram of throughput comparison of respective key-value storage systems under a fixed-length load of 16 KB according to an embodiment of the present disclosure. A scavenger represents a key-value separated LSM-tree key-value storage system corresponding to the data collection method provided by the embodiment of the present disclosure; and Throughput represents throughput in megabytes per second (MB/s). FIG. 9 shows a schematic diagram of throughput comparison of respective key-value storage systems under a mixed load of 8 KB according to an embodiment of the present disclosure, where a ratio of large and small key-value pair data in the mixed load of 8 KB is 1:1.

Based on FIGS. 8 and 9, it can be seen that the scavenger key-value storage system provided in the embodiments of the present disclosure improves the performance under write-intensive loads by a factor of 1.5-5.0 as compared to several other storage systems in the prior art, both under fixed-length loads and variable-length loads.

Figure 10:
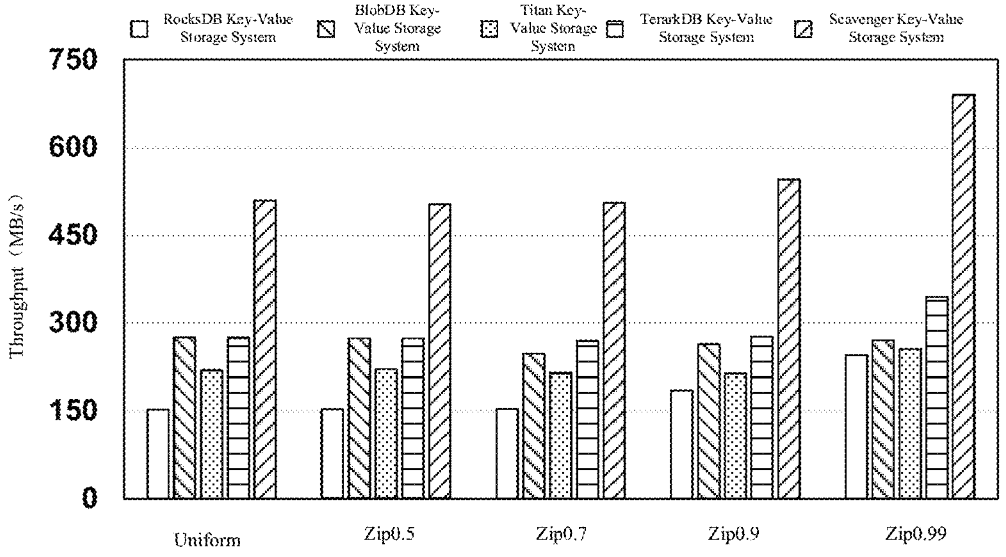
FIG. 10 shows a schematic diagram of throughput comparison of respective key-value storage systems under different zipfian distributions according to an embodiment of the present disclosure.

Second, a test was performed under loads with different degrees of skew, in which the degree of skew was decided by the zipfian factor. 100 GiB of data was first inserted for warm-up, and then an Update load was executed to perform an update operation on these 100 GiB key-value pairs, with a total of 300 GiB of data updated. FIG. 10 shows a schematic diagram of throughput comparison of respective key-value storage systems under different zipfian distributions according to an embodiment of the present disclosure, with uniform representing a zipfian factor of 0, Zip0.5 representing a zipfian factor of 0.5, Zip0.7 representing a zipfian factor of 0.7, Zip0.9 representing a zipfian factor of 0.9, and Zip0.99 representing a zipfian factor of 0.99. Based on FIG. 10, it can be seen that the scavenger storage system provided by an embodiment of the present disclosure improves performance under write-intensive loads by a factor of 1.8-3.3 as compared to several other storage systems in the prior art, regardless of the degree of load skew.

A person skilled in the art can understand that, in the specific implementation of the above-mentioned method, the writing order of the steps does not imply a strict order of execution and does not constitute any limitation of the implementation process, and the specific execution order of the steps should be determined by its function and possible internal logic.

Based on the same inventive concept, an embodiment of the present disclosure further provides a data collection apparatus corresponding to the data collection method. Since the apparatus in the embodiment of the present disclosure solves the problem in a similar way to the data collection method in the embodiment of the present disclosure, the implementation of the apparatus may refer to the implementation of the method, and repeated descriptions are omitted.

Figure 11:
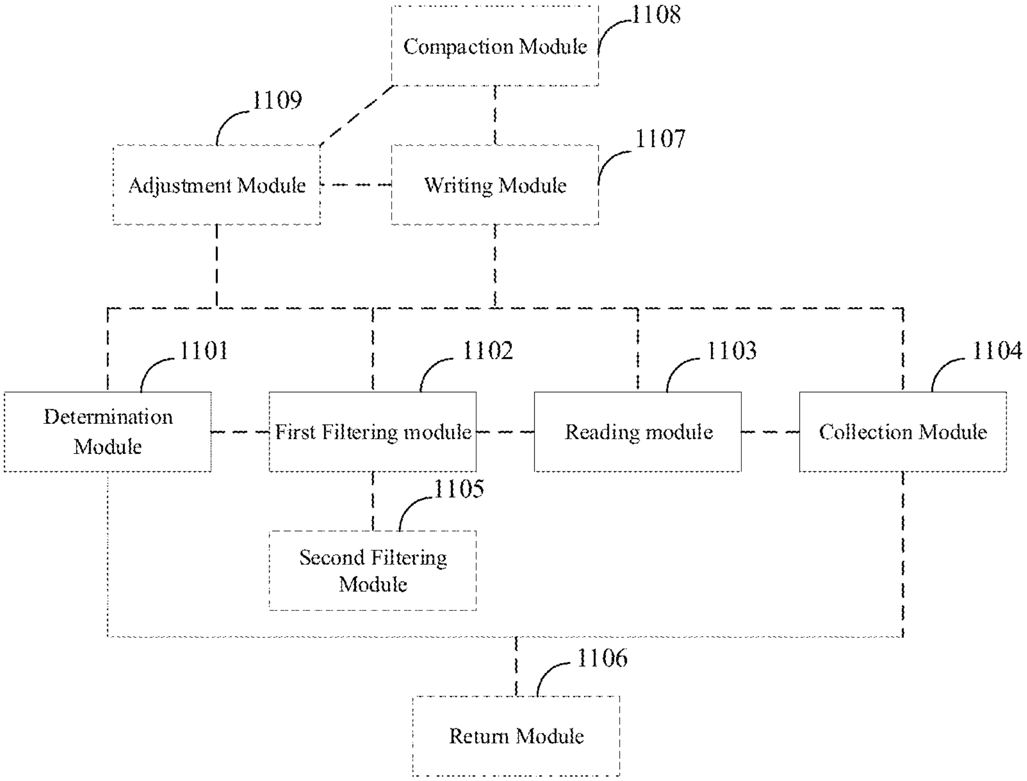
FIG. 11 shows a schematic diagram of a data collection apparatus according to an embodiment of the present disclosure.

FIG. 11 shows a schematic diagram of a data collection apparatus according to an embodiment of the present disclosure. The data collection apparatus includes:

a determination module 1101, configured to determine, in response to a garbage collection request, respective first index entries from a first data table to be processed, where first key-value pair data and the first index entries are stored in the first data table, the first key-value pair data is derived from a key-value separated log-structured merge tree, and first key data and storage location information of the first key-value pair data corresponding to the first key data in the first data table are stored in the first index entries;

a first selecting module 1102, configured to filter valid target key data from the first key data stored in the respective first index entries according to current respective second data tables in the log-structured merge tree;

a reading module 1103, configured to read target value data corresponding to the respective target key data in the first data table according to the storage location information of the respective target key data in the first index entries; and a collection module 1104, configured to construct a new first data table according to the target key data and the target value data, and collect the first data table to be processed; where target key-value pair data consisting of the target key data and the target value data, as well as new first index entries, is stored in the new first data table; the new first index entries each include the target key data and storage location information of the corresponding target key-value pair data in the new first data table.

In a possible implementation, the first selecting module 1102, when selecting the valid target key data from the first key data stored in the respective first index entries according to the current respective second data tables in the log-structured merge tree, is configured to:

select first key data identical to any one of the second key data, as the valid target key data, from the first key data stored in the respective first index entries according to respective second key data stored in the current respective second data tables in the log-structured merge tree.

In a possible implementation, the first selecting module 1102, when selecting the valid target key data from the first key data stored in the respective first index entries according to the current respective second data tables in the log-structured merge tree, is configured to:

traverse, with respect to any one of the first key data, the respective second data tables sequentially in accordance with a hierarchy to which the respective second data table belongs in the log-structured merge tree to search a second data table associated with the first key data; and determine that the first key data is the valid target key data in response to that the second data table associated with the first key data is searched and the second key data in the second data table which is identical to the first key data has the same version as the first key data.

In a possible implementation, the first selecting module 1102, when selecting the valid target key data from the first key data stored in the respective first index entries according to the current respective second data tables in the log-structured merge tree, is configured to:

traverse, with respect to any one of the first key data, the respective second data tables sequentially in accordance with a hierarchy to which the respective second data table belongs in the log-structured merge tree to determine a second data table associated with the first key data; and read a first target index data block from the second data table associated with the first key data, wherein the first target index data block comprises multiple second index entries, the second index entries are first type of index entries and/or second type of index entries, the first type of index entries are indexes associated with the second key data and table indexes of the first data table in which the first value data corresponding to the second key data is located, the second type of index entries are index entries associated with third key data and storage location information of key-value pair data corresponding to the third key data in the second data table, the key-value pair data corresponding to the third key data has a data volume less than a preset data volume, and the key-value pair data corresponding to the second key data has a data volume greater than or equal to the preset data volume;

determine, in response to the multiple second index entries with the first type of index entries, whether second key data matching the first key data exists according to the second key data in the first type of index entries; and take the first key data as the target key data in response to determining that second key data matching the first key data exists.

In a possible implementation, the second data table associated with the first key data contains second key data identical to the first key data, and in response to that there exists multiple second data tables containing the second key data identical to the first key data, a second data table with the highest hierarchical level in the multiple second data tables is token as the second data table associated with the first key data.

In a possible implementation, the apparatus further includes a second selecting module 1105, before selecting the first key data identical to any one of the second key data as the valid target key data from the first key data stored in the respective first index entries according to the respective second key data stored in current respective second data tables in the log-structured merge tree, the second selecting module 1105 is configured to:

determine, with respect to any one of the first key data, whether matched key data matching the first key data exists from buffered key data with a hot data feature that is contained in a set of key data buffered in a memory, wherein the hot data feature is used for indicating that the buffered key data is key data repeatedly written multiple times;

determine whether the matched key data and the first key data are the same version in response to that there exists the matched key data matched with the first key data;

determine that the first key data is invalid key data in response to that the matched key data and the first key data are not the same version; or take the first key data directly as the target key data in response to that the matched key data and the first key data are the same version.

In a possible implementation, the second selecting module 1105, when selecting the first key data identical to any one of the second key data as the valid target key data, from the first key data stored in the respective first index entries according to the respective second key data stored in current respective second data tables in the log-structured merge tree, is further configured to:

select the target key data from the first key data without the matched key data according to the respective second key data stored in the respective second data tables.

In a possible implementation, the collection module 1104, when constructing the new first data table according to the target key data and the target value data, is configured to:

determine the target key data with the matched key data as hot key data with the hot data feature, and/or, determining the target key data without the matched key data as cold key data with a cold data feature, wherein the cold data feature is used for indicating that the cold key data is key data written once; and construct the new first data table with the hot data feature according to the respective hot key data and target value data corresponding to the hot key data, and/or, constructing the new first data table with the cold data feature according to the respective cold key data and target value data corresponding to the cold key data.

In a possible implementation, the determination module 1101, when determining, in response to the garbage collection request, the respective first index entries from the first data table to be processed, is configured to:

determine, in response to the garbage collection request, multiple first data tables;

select a first data table with a hot data feature from the multiple first data tables; and take the filtered first data table with the hot data feature as the first data table to be processed, and determining the respective first index entries from the first data table to be processed In a possible implementation, the apparatus further includes a return module 1106, configured to, after taking the filtered first data table with the hot data feature as the first data table to be processed and performing the data collection method, determine the remaining first data tables with the cold data feature as the first data table to be processed, and performing the data collection method.

In a possible embodiment, the determination module 1101, when determining the respective first index entries from the first data table to be processed, is configured to:

determine whether the respective first index entries with the first data table to be processed are pre-buffered in the memory; and determine the respective first index entries from the first data table to be processed in response to that the respective first index entries associated with the first data table to be processed are not pre-buffered in the memory; and buffering the respective first index entries in the memory.

In an optional implementation, the apparatus further includes:

a writing module 1107 configured to receive a data write operation instruction to determine key-value pair data to be stored;

select, in response to the data volume of the determined key-value pair data to be stored reaching a data volume threshold, third key-value pair data with a data volume greater than or equal to a preset data volume and fourth key-value pair data with a data volume less than the preset data volume from multiple key-value pair data to be stored;

construct a new first data table according to the third key-value pair data; and construct a new second data table according to the fourth key-value pair data, and table indexes of the first data table in which key data in the third key-value pair data and value data in the third key-value pair data are located.

In a possible implementation, the writing module 1107 when constructing the new first data table according to the third key-value pair data, is configured to:

obtain a set of key data buffered in the memory, wherein the set of key data includes at least one piece of buffered key data with a hot data feature, the hot data feature is used for indicating that the buffered key data is key data repeatedly written multiple times;

select fifth key-value pair data with matched buffered key data from the third key-value pair data; and construct a new first data table with the hot data feature according to the fifth key-value pair data; and constructing a new first data table with a cold data feature according to key-value pair data in the third key-value pair data other than the fifth key-value pair data.

In a possible implementation, the apparatus further includes a compaction module 1108 for; after constructing the new second data table, the compaction module 1108 is configured to:

perform, in response to a data table compaction operation instruction, a data compaction operation on at least part of the constructed second data tables of the log-structured merge tree to obtain a merged second data table, wherein table indexes in second index entries corresponding to the second key data in the merged second data table are determined according to a first data table in which value data corresponding to the second key data is located at the time it is last written; and update the set of key data using the second key data in the merged second data table.

In a possible implementation, the apparatus further includes an adjustment module 1109 configured to:

determine a total size of storage space currently used by the log-structured merge tree and all the first data tables; and adjust a receiving frequency of a data write operation according to the total size of storage space and a preset space threshold.

In a possible implementation, the adjustment module 1109, when adjusting the receiving frequency of the data write operation according to the total size of storage space and the preset space threshold, is configured to:

determine a receiving frequency decrease value for the data write operation in response to the total size of storage space reaches a first preset space threshold, and controlling the receiving frequency of the data write operation according to the receiving frequency decrease value; or stop receiving the data write operation instruction in response to the total size of storage space reaching a second preset space threshold, wherein the second preset space threshold is greater than the first preset space threshold.

In a possible embodiment, the adjustment module 1109 is further configured to:

determine a first thread number of a garbage collection thread in response to the total size of storage space does not reach the first preset space threshold, wherein the garbage collection thread is used for performing a garbage collection operation for at least one first data table; or determine a second thread number of a garbage collection thread in response to the total size of storage space reaches the first preset space threshold, wherein the second thread number is greater than the first thread number; or determine a third thread number of a garbage collection thread in response to the total size of storage space reaches the first preset space threshold, wherein the third thread number is greater than the second thread number.

The descriptions of processing flows of the modules and the interaction flows between the modules in the apparatus may be referred to the relevant descriptions in the above-mentioned method embodiments, and will not be described in detail herein.

Figure 12:
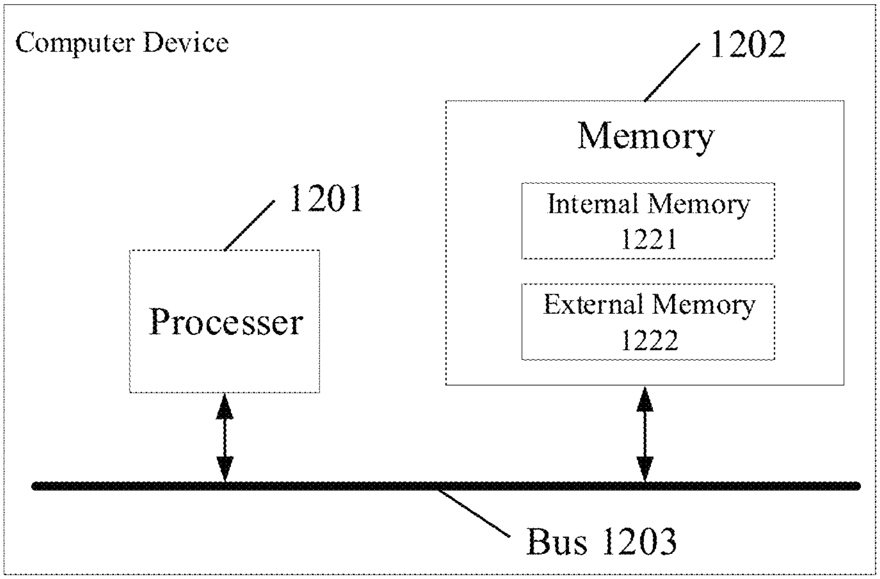
FIG. 12 shows a schematic structural diagram of a computer device according to an embodiment of the present disclosure.

Based on the same technical concept, an embodiment of the present disclosure further provides a computer device. FIG. 12 is a schematic structural diagram of a computer device according to an embodiment of the present disclosure. The computer device includes:

a processor 1201, a memory 1202 and a bus 1203. The memory 1202 stores machine-readable instructions executable by the processor 1201, the processor 1201 is configured to execute the machine-readable instructions stored in the memory 1202, and when the machine-readable instructions are executed by the processor 1201, the processor 1201 performs the data collection method in the foregoing embodiments.

The memory 1202 described above includes an internal memory 1221 and an external memory 1222. The internal memory 1221, also referred to as internal storage, is used for temporary storage of computing data in the processor 1201, as well as data exchanged with the external memory 1222, such as a hard disk. The processor 1201 exchanges data with external memory 1222 through the internal memory 1221. During operation of the computer device, the processor 1201 is in communication with the memory 1202 via bus 1203, causing the processor 1201 to execute the instructions mentioned in the foregoing method embodiments.

An embodiment of the present disclosure further provides a computer-readable storage medium, the computer-readable storage medium storing a computer program. When the computer program is run by a processor, the steps of the data collection method described in the method embodiments above are performed. The storage medium may be a volatile or non-volatile computer-readable storage medium.

A computer program product using the data collection method provided in the embodiments of the present disclosure includes a computer program code; the program code includes instructions that may be configured to execute the steps of the data collection method described in the above-mentioned method embodiments, which may be specified in the above-mentioned method embodiments, and will not be repeated herein.

The computer program product may be implemented specifically by means of hardware, software or a combination thereof. In one optional embodiment, the computer program product is specifically embodied as a computer storage medium, and in another optional embodiment, the computer program product is specifically embodied as a software product, such as an SDK (Software Development Kit), and the like.

It may be clearly understood by a person skilled in the art that, for the purpose of convenient and brief description, for a detailed working process of the foregoing system and apparatus, reference may be made to a corresponding process in the foregoing method embodiments, and details are not described again herein. In the several embodiments provided in this disclosure, it should be understood that the disclosed system, apparatus, and method may be implemented in other manners. The described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some communication interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of the present disclosure may be integrated into one processing unit, or each of the units may exist alone physically, or more than two units are integrated into one unit.

When the functions are implemented in a form of a software functional unit and sold or used as an independent product, the functions may be stored in a non-volatile computer-readable storage medium executable to the processor. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this disclosure. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

If the technical solution of the present application involves personal information, the product applying the technical solution of the present application has clearly informed the rules of handling personal information and obtained the individual's consent before handling personal information. If the technical solution of the present application involves sensitive personal information, the product applying the technical solution of the present application has obtained the individual's consent before handling the sensitive personal information while meeting the requirement of "express consent". For example, at a personal information collection apparatus such as a camera, a clear and conspicuous sign is set up to inform the user that he/she has entered the scope of personal information collection and that personal information will be collected, and individuals who voluntarily enter the scope of collection are deemed to have consented to the collection of their personal information; or on the personal information processing apparatus, the rules for personal information processing are communicated using visible signs/information, authorization is obtained from individuals through pop-up messages or by asking individuals to upload their personal information on their own. The rules for personal information processing may include information on the person who processes personal information, the purpose of personal information processing, the processing manner, and the types of personal information to be processed.

Finally, it should be noted that the above-mentioned embodiments are only specific implementations of the present disclosure and used to illustrate the technical solutions of the present disclosure, and are not intended to limit the present disclosure; and the protection scope of the present disclosure is not limited thereto; although the present application has been described in detail with reference to the foregoing embodiments, a person of ordinary skill in the art should understand that within the technical scope disclosed in the present disclosure, any person of skill familiar with the technical field can still modify or conceive of changes to the technical solutions recorded in the foregoing embodiments, or make equivalent substitutions for some of the technical features therein; and these modifications, changes or substitutions do not cause the essence of the corresponding technical solutions to deviate from the spirit and scope of the technical solutions of the embodiments of the present disclosure, all of which shall be covered within the protection scope of the present disclosure. Therefore, the protection scope of the present disclosure shall be subject to the protection scope of the claims.

The invention claimed is:

1. A data collection method, comprising:

determining, in response to a garbage collection request, respective first index entries from a first data table, wherein first key-value pair data and the first index entries are stored in the first data table, the first key-value pair data is derived from a key-value separated log-structured merge tree, and first key data and storage location information in the first data table of the first key-value pair data corresponding to the first key data are stored in the first index entries;

selecting valid fourth key data from the first key data stored in the respective first index entries according to current respective second data tables in the log-structured merge tree, wherein second key data stored in the second data tables comprises valid key data of the first key data;

reading second value data corresponding to respective fourth key data in the first data table according to storage location information in the first index entries where the respective fourth key data are located; and constructing a new first data table according to the fourth key data and the second value data, and collecting the first data table, wherein seventh key-value pair data consisting of the fourth key data and the second value data, as well as new first index entries, are stored in the new first data table, the fourth key data and storage location information in the new first data table of the seventh key-value pair data corresponding to the fourth key data are comprised in the new first index entries.

2. The method according to claim 1, wherein selecting the valid fourth key data from the first key data stored in the respective first index entries according to the current respective second data tables in the log-structured merge tree, comprises:

selecting first key data identical to any one of the second key data, as the valid fourth key data, from the first key data stored in the respective first index entries according to respective second key data stored in the current respective second data tables in the log-structured merge tree.

3. The method according to claim 2, wherein selecting the first key data identical to any one of the second key data as the valid fourth key data from the first key data stored in the respective first index entries according to the respective second key data stored in current respective current second data tables in the log-structured merge tree, comprises:

traversing, with respect to any one of the first key data, the respective second data tables sequentially in accordance with a hierarchy to which the respective second data table belongs in the log-structured merge tree to search a second data table associated with the first key data; and determining that the first key data is the valid fourth key data in response to that the second data table associated with the first key data is searched and the second key data in the second data table which is identical to the first key data has a same version as the first key data.

4. The method according to claim 3, wherein the second data table associated with the first key data contains second key data identical to the first key data, and in response to that there exists multiple second data tables containing the second key data identical to the first key data, a second data table with a highest hierarchical level in the multiple second data tables is taken as the second data table associated with the first key data.

5. The method according to claim 2, wherein selecting the first key data identical to any one of the second key data as the valid fourth key data, from the first key data stored in the respective first index entries according to the respective second key data stored in current respective second data tables in the log-structured merge tree, comprises:

traversing, with respect to any one of the first key data, the respective second data tables sequentially in accordance with a hierarchy to which the respective second data table belongs in the log-structured merge tree to determine a second data table associated with the first key data; and reading a first index data block from the second data table associated with the first key data, wherein the first index data block comprises multiple second index entries, the second index entries are first type of index entries and/or second type of index entries, the first type of index entries are indexes associated with the second key data and table indexes of the first data table in which first value data corresponding to the second key data is located, the second type of index entries are index entries associated with third key data and storage location information of key-value pair data corresponding to the third key data in the second data table, the key-value pair data corresponding to the third key data has a data volume less than a first data volume, and the key-value pair data corresponding to the second key data has a data volume greater than or equal to the first data volume;

determining, in response to the multiple second index entries with the first type of index entries, whether second key data matching the first key data exists according to the second key data in the first type of index entries; and taking the first key data as the fourth key data in response to determining that second key data matching the first key data exists.

6. The method according to claim 1, wherein before selecting the first key data identical to any one of the second key data as the valid fourth key data from the first key data stored in the respective first index entries according to the respective second key data stored in current respective second data tables in the log-structured merge tree, the method comprises:

determining, with respect to any one of the first key data, whether matched key data matching the first key data exists from buffered key data with a hot data feature that is contained in a set of key data buffered in a memory, wherein the hot data feature is used for indicating that the buffered key data is key data repeatedly written multiple times;

determining whether the matched key data and the first key data are the same version in response to that there exists the matched key data matched with the first key data; and determining that the first key data is invalid key data in response to that the matched key data and the first key data are not the same version; or taking the first key data directly as the fourth key data in response to that the matched key data and the first key data are the same version.

7. The method according to claim 6, wherein selecting the first key data identical to any one of the second key data as the valid fourth key data, from the first key data stored in the respective first index entries according to the respective second key data stored in current respective second data tables in the log-structured merge tree, comprises:

selecting the fourth key data from the first key data without the matched key data according to the respective second key data stored in the respective second data tables.

8. The method according to claim 7, wherein constructing the new first data table according to the fourth key data and the second value data, comprises:

determining the fourth key data with the matched key data as hot key data with the hot data feature, and/or, determining the fourth key data without the matched key data as cold key data with a cold data feature, wherein the cold data feature is used for indicating that the cold key data is key data written once; and constructing the new first data table with the hot data feature according to the respective hot key data and second value data corresponding to the hot key data, and/or, constructing the new first data table with the cold data feature according to the respective cold key data and second value data corresponding to the cold key data.

9. The method according to claim 1, wherein determining, in response to the garbage collection request, the respective first index entries from the first data table, comprises:

determining, in response to the garbage collection request, multiple first data tables;

selecting a first data table with a hot data feature from the multiple first data tables; and taking the filtered first data table with the hot data feature as the first data table, and determining the respective first index entries from the first data table.

10. The method according to claim 9, wherein the method further comprises:

after taking the filtered first data table with the hot data feature as the first data table and performing the data collection method, determining the remaining first data tables with the cold data feature as the first data table, and performing the data collection method.

11. The method according to claim 9, wherein determining the respective first index entries from the first data table, comprises:

determining whether the respective first index entries associated with the first data table are pre-buffered in the memory; and determining the respective first index entries from the first data table in response to that the respective first index entries associated with the first data table are not pre-buffered in the memory; and buffering the respective first index entries in the memory.

12. The method according to claim 1, wherein the method further comprises:

receiving a data write operation instruction to determine eighth key-value pair data;

selecting, in response to the data volume of the determined eighth key-value pair data reaching a data volume threshold, third key-value pair data with a data volume greater than or equal to a first data volume and fourth key-value pair data with a data volume less than the first data volume from multiple eighth key-value pair data;

constructing a new first data table according to the third key-value pair data; and constructing a new second data table according to the fourth key-value pair data, and table indexes of the first data table in which key data in the third key-value pair data and value data in the third key-value pair data are located.

13. The method according to claim 12, wherein constructing the new first data table according to the third key-value pair data, comprises:

obtaining a set of key data buffered in the memory, wherein the set of key data includes at least one piece of buffered key data with a hot data feature, the hot data feature is used for indicating that the buffered key data is key data repeatedly written multiple times;

selecting fifth key-value pair data with matched buffered key data from the third key-value pair data; and constructing a new first data table with the hot data feature according to the fifth key-value pair data; and constructing a new first data table with a cold data feature according to key-value pair data in the third key-value pair data other than the fifth key-value pair data.

14. The method according to claim 13, wherein after constructing the new second data table, the method further comprises:

performing, in response to a data table compaction operation instruction, a data compaction operation on at least part of the constructed second data tables of the log-structured merge tree to obtain a merged second data table, wherein table indexes in second index entries corresponding to the second key data in the merged second data table are determined according to a first data table in which value data corresponding to the second key data is located at the time it is last written; and updating the set of key data using the second key data in the merged second data table.

15. The method according to claim 1, wherein the method further comprises:

determining a total size of storage space currently used by the log-structured merge tree and all the first data tables; and adjusting a receiving frequency of a data write operation according to the total size of storage space and a third space threshold.

16. The method according to claim 15, wherein adjusting the receiving frequency of the data write operation according to the total size of storage space and the third space threshold, comprises:

determining a receiving frequency decrease value for the data write operation in response to the total size of storage space reaches a first space threshold, and controlling the receiving frequency of the data write operation according to the receiving frequency decrease value; or stopping receiving the data write operation instruction in response to the total size of storage space reaching a second space threshold, wherein the second space threshold is greater than the first space threshold.

17. The method according to claim 16, wherein the method further comprises:

determining a first thread number of a garbage collection thread in response to the total size of storage space does not reach the first space threshold, wherein the garbage collection thread is used for performing a garbage collection operation for at least one first data table; or determining a second thread number of a garbage collection thread in response to the total size of storage space reaches the first space threshold, wherein the second thread number is greater than the first thread number; or determining a third thread number of a garbage collection thread in response to the total size of storage space reaches the first space threshold, wherein the third thread number is greater than the second thread number.

18. An electronic device:

at least a processor, and a non-transitory memory with instructions thereon, wherein the instructions upon execution by the processor, cause the processor to:

determine, in response to a garbage collection request, respective first index entries from a first data table, wherein first key-value pair data and the first index entries are stored in the first data table, the first key-value pair data is derived from a key-value separated log-structured merge tree, and first key data and storage location information in the first data table of the first key-value pair data corresponding to the first key data are stored in the first index entries;

filter out valid fourth key data from the first key data stored in the respective first index entries according to current respective second data tables in the log-structured merge tree, wherein second key data stored in the second data tables comprises valid key data of the first key data;

read second value data corresponding to the respective fourth key data in the first data table according to storage location information in the first index entries where the respective fourth key data are located; and construct a new first data table according to the fourth key data and the second value data, and collecting the first data table, wherein seventh key-value pair data consisting of the fourth key data and the second value data, as well as new first index entries, are stored in the new first data table, the fourth key data and storage location information in the new first data table of the seventh key-value pair data corresponding to the fourth key data are comprised in the new first index entries.

19. The electronic device according to claim 18, wherein the processor is caused to:

filter out first key data identical to any one of the second key data, as the valid fourth key data, from the first key data stored in the respective first index entries according to respective second key data stored in the current respective second data tables in the log-structured merge tree.

20. A non-transitory computer-readable storage medium storing instructions that cause at least a processor to:

determine, in response to a garbage collection request, respective first index entries from a first data table, wherein first key-value pair data and the first index entries are stored in the first data table, the first key-value pair data is derived from a key-value separated log-structured merge tree, and first key data and storage location information in the first data table of the first key-value pair data corresponding to the first key data are stored in the first index entries;

filter out valid fourth key data from the first key data stored in the respective first index entries according to current respective second data tables in the log-structured merge tree, wherein second key data stored in the second data tables comprises valid key data of the first key data;

read second value data corresponding to the respective fourth key data in the first data table according to storage location information in the first index entries where the respective fourth key data are located; and construct a new first data table according to the fourth key data and the second value data, and collecting the first data table, wherein seventh key-value pair data consisting of the fourth key data and the second value data, as well as new first index entries, are stored in the new first data table, the fourth key data and storage location information in the new first data table of the seventh key-value pair data corresponding to the fourth key data are comprised in the new first index entries.

* * * * *